US012719562B2

(12) United States Patent
Wu et al.

(10) Patent No.: US 12,719,562 B2
(45) Date of Patent: Aug. 25, 2026

(54) BEAM MANAGEMENT FOR NON-TERRESTRIAL NETWORK COMMUNICATION

(71) Applicant: QUALCOMM Incorporated, San Diego, CA (US)

(72) Inventors: Shuanshuan Wu, San Diego, CA (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 511 days.

(21) Appl. No.: 18/327,735

(22) Filed: Jun. 1, 2023

(65) Prior Publication Data

US 2024/0405852 A1 Dec. 5, 2024

(51) Int. Cl.

| | |
|---|---|
| ***H04B 7/185*** | (2006.01) |
| ***H04W 64/00*** | (2009.01) |
| *H04L 67/50* | (2022.01) |

(52) U.S. Cl.

CPC ........ *H04B 7/18513* (2013.01); *H04W 64/00* (2013.01); *H04L 67/50* (2022.05)

(58) Field of Classification Search

CPC .. H04B 7/185; H04B 7/1851; H04B 7/18513; H04B 7/18508; H04B 7/18515; H04B 7/18528; H04B 7/1853; H04B 7/18571; H04B 7/18576; H04B 7/18578; H04B 7/2046; H04B 10/118; H04B 7/0834; H04B 7/0695; H04B 7/06952; H04B 7/06965; H04B 7/088; H04W 64/00; H04W 36/08; H04W 72/04; H04W 72/046; H04W 84/04; H04L 2012/5608; H04L 41/14; H04L 41/147; H04L 51/222; H04L 67/50

See application file for complete search history.

(56) References Cited

U.S. PATENT DOCUMENTS 5,408,237 A * 4/1995 Patterson ................. H01Q 3/24 455/12.1
5,956,644 A 9/1999 Miller et al.

(Continued)

FOREIGN PATENT DOCUMENTS

CN 11371486 B * 4/2022 ............. H04B 7/185
CN 114915325 A 8/2022

(Continued)

OTHER PUBLICATIONS

International Search Report and Written Opinion—PCT/US2024/028942—ISA/EPO—Oct. 8, 2024.

*Primary Examiner* — Warner Wong

(74) *Attorney, Agent, or Firm* — Loza & Loza, LLP/QUALCOMM Incorporated

(57) ABSTRACT

Aspects provide mechanisms for predicting a change in a beam direction of a transmit and/or receive beam used for communication between a user equipment (UE) and a non-terrestrial network (NTN) entity and to adjust the beam direction of the beam on the UE in accordance with the predicted beam direction change. In some examples, the UE may predict the beam direction change based on one or more mobility parameters indicating a predicted change in the relative position of the UE with respect to the NTN entity. In other examples, a network entity, such as the NTN entity, a core network entity or data network entity, may predict the beam change direction based on the one or more mobility parameters.

30 Claims, 12 Drawing Sheets

(56) References Cited

U.S. PATENT DOCUMENTS

| | | | | |
|---|---|---|---|---|
| 2019/0223058 | A1* | 7/2019 | Fukui | H04W 36/0088 |
| 2021/0058145 | A1* | 2/2021 | Alasti | H04W 72/0453 |
| 2021/0058914 | A1* | 2/2021 | Chae | H04W 72/046 |
| 2022/0182913 | A1* | 6/2022 | Liu | H04W 36/0072 |
| 2022/0353837 | A1 | 11/2022 | Hosseinian et al. | |
| 2023/0179292 | A1* | 6/2023 | Alasti | H04W 28/20<br>370/335 |
| 2023/0179294 | A1* | 6/2023 | Kuang | H04B 7/18541<br>370/316 |
| 2023/0308157 | A1 | 9/2023 | Bi et al. | |
| 2024/0030994 | A1* | 1/2024 | Zhao | H04W 36/322 |
| 2024/0073926 | A1* | 2/2024 | Qiao | H04B 7/18513 |
| 2024/0155374 | A1* | 5/2024 | Wei | H04B 7/0695 |
| 2024/0406759 | A1 | 12/2024 | Luo | |
| 2025/0126535 | A1* | 4/2025 | Watts | H04B 7/18541 |

FOREIGN PATENT DOCUMENTS

| | | | | |
|---|---|---|---|---|
| CN | 116488704 | * | 7/2023 | H04B 7/185 |
| CN | 116527096 | * | 8/2023 | H04B 7/06 |
| WO | 2022047666 | A1 | 3/2022 | |
| WO | 2022228003 | A1 | 11/2022 | |

* cited by examiner 186
188
184
Beam Manager
100
174
174'
122b
122a
154
134
142
110
172
IP Services
190
106
178
148
152
180
176
166
UPF
118
146
Core Network 160
164
SMF
132
148
182
Beam Manager
150
150
168
Other AMFs
162
AMF
126
130
144
148
170
UDM
148
114
116
124
128
102
108
120
156
158
104
140

BEAM MANAGEMENT FOR NON-TERRESTRIAL NETWORK COMMUNICATION

INTRODUCTION

The technology discussed below relates generally to wireless communication networks, and more particularly, to non-terrestrial network (NTN) wireless communication systems.

Next-generation wireless communication systems (e.g., 5GS) may include a 5G core network and a 5G radio access network (RAN), such as a New Radio (NR)-RAN. The NR-RAN may be a terrestrial RAN or a non-terrestrial RAN. Non-terrestrial RANs may include airborne or spaceborne vehicles, such as satellites, to support connections between a user equipment (UE) and the core network. For example, non-terrestrial RANs can support connections over trains, boats, and planes, and in rural, remote, unserved and/or underserved areas. In some examples, one or more satellites may provide backhaul services between a terrestrial RAN and the core network. In other examples, a satellite may incorporate the functionality of a base station to directly serve a satellite coverage area.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, an apparatus for wireless communication at a user equipment (UE) is provided. The apparatus includes one or more memories and one or more processors coupled to the one or more memories. The one or more processors can be configured to communicate with a non-terrestrial network (NTN) entity using a first beam at the UE, where the first beam includes a first beam direction. The one or more processors can further be configured to switch from the first beam having the first beam direction to a second beam having a second beam direction different than the first beam direction in accordance with a predicted beam direction change based on a predicted change in a relative position of the UE with respect to the NTN entity.

Another example provides a method operable at a user equipment (UE). The method includes communicating with a non-terrestrial network (NTN) entity using a first beam at the UE, where the first beam includes a first beam direction. The method further includes switching from the first beam having the first beam direction to a second beam having a second beam direction different than the first beam direction in accordance with a predicted beam direction change based on a predicted change in a relative position of the UE with respect to the NTN entity.

Another example provides an apparatus for wireless communication at a user equipment (UE) including means for communicating with a non-terrestrial network (NTN) entity using a first beam at the UE, where the first beam includes a first beam direction. The apparatus further includes means for switching from the first beam having the first beam direction to a second beam having a second beam direction different than the first beam direction in accordance with a predicted beam direction change based on a predicted change in a relative position of the UE with respect to the NTN entity.

Another example provides a non-transitory computer-readable medium having stored therein instruction executable by one or more processors of a user equipment (UE) to communicate with a non-terrestrial network (NTN) entity using a first beam at the UE, where the first beam includes a first beam direction. The non-transitory computer-readable medium can further include instructions executable by the one or more processors to switch from the first beam having the first beam direction to a second beam having a second beam direction different than the first beam direction in accordance with a predicted beam direction change based on a predicted change in a relative position of the UE with respect to the NTN entity.

Another example provides an apparatus for wireless communication at a network entity. The apparatus includes one or more memories and one or more processors coupled to the one or more memories. The one or more processors can be configured to identify a first beam at a user equipment (UE) for communication with a non-terrestrial network (NTN) entity associated with the network entity, where the first beam includes a first beam direction. The one or more processors can further be configured to predict a predicted beam direction change in accordance with one or more mobility parameters indicating a predicted change in a relative position of the UE with respect to the NTN entity and provide an indication of a second beam different than the first beam for the UE to communicate with the NTN entity, where the second beam includes a second beam direction in accordance with the predicted beam direction change.

Another example provides a method operable at a network entity. The method includes identifying a first beam at a user equipment (UE) for communication with a non-terrestrial network (NTN) entity associated with the network entity, where the first beam has a first beam direction. The method further includes predicting a predicted beam direction change in accordance with one or more mobility parameters indicating a predicted change in a relative position of the UE with respect to the NTN entity and providing an indication of a second beam different than the first beam for the UE to communicate with the NTN entity, where the second beam includes a second beam direction in accordance with the predicted beam direction change.

Another example provides an apparatus for wireless communication at a network entity including means for identifying a first beam at a user equipment (UE) for communication with a non-terrestrial network (NTN) entity associated with the network entity, where the first beam has a first beam direction. The apparatus further includes means for predicting a predicted beam direction change in accordance with one or more mobility parameters indicating a predicted change in a relative position of the UE with respect to the NTN entity and means for providing an indication of a second beam different than the first beam for the UE to communicate with the NTN entity, where the second beam includes a second beam direction in accordance with the predicted beam direction change.

Another example provides a non-transitory computer-readable medium having stored therein instruction executable by one or more processors of a network entity to identify a first beam at a user equipment (UE) for communication with a non-terrestrial network (NTN) entity associated with the network entity, where the first beam includes a first beam direction. The non-transitory computer-readable medium can further include instructions executable by the one or more processors to predict a predicted beam direction change in accordance with one or more mobility parameters indicating a predicted change in a relative position of the UE with respect to the NTN entity and provide an indication of a second beam different than the first beam for the UE to communicate with the NTN entity, where the second beam includes a second beam direction in accordance with the predicted beam direction change.

These and other aspects will become more fully understood upon a review of the detailed description, which follows. Other aspects, features, and examples will become apparent to those of ordinary skill in the art upon reviewing the following description of specific exemplary aspects in conjunction with the accompanying figures. While features may be discussed relative to certain examples and figures below, all examples can include one or more of the features discussed herein. In other words, while one or more examples may be discussed as having certain features, one or more of such features may also be used in accordance with the various examples discussed herein. Similarly, while examples may be discussed below as device, system, or method examples, it should be understood that such examples can be implemented in various devices, systems, and methods.

DETAILED DESCRIPTION

Figure 1:
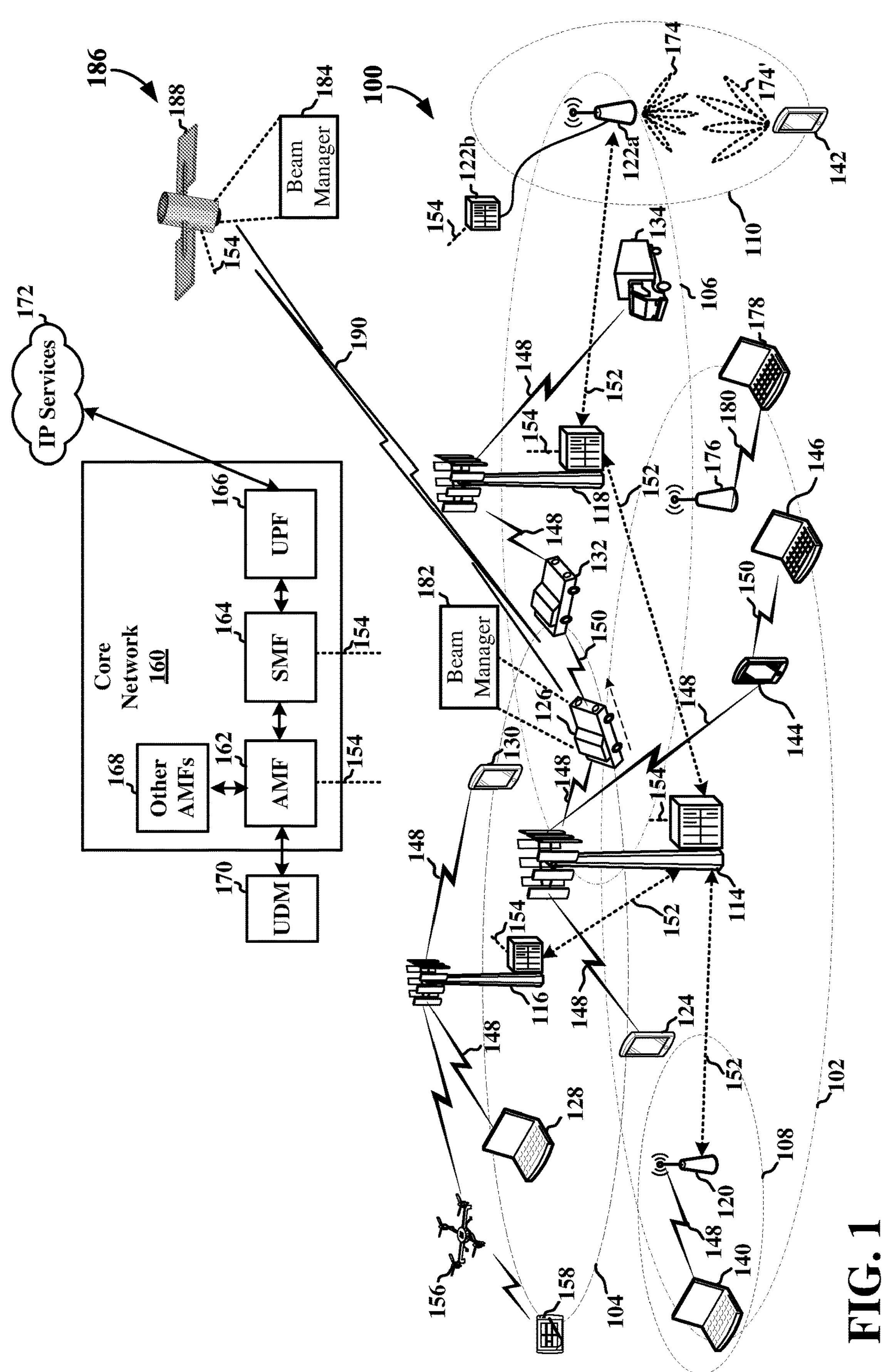
FIG. 1 is a diagram illustrating an example of a radio access network (RAN) according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component-based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for the implementation and practice of claimed and described examples. For example, transmission and reception of wireless signals necessarily includes a number of components for analog and digital purposes (e.g., hardware components including antenna, radio frequency (RF) chains (RF-chains), power amplifiers, modulators, buffer, processor(s), interleaver, adders/summers, etc.). It is intended that innovations described herein may be practiced in a wide variety of devices, chip-level components, systems, distributed arrangements, disaggregated arrangements (e.g., base station and/or UE), end-user devices, etc., of varying sizes, shapes, and constitution.

In wireless communication networks, such as those specified under standards for 5G New Radio (NR) or 6G or future generations, vehicles may be equipped with onboard units (OBUs), also referred to herein as user equipment (UE), to provide wireless connectivity to other vehicles and to cellular networks. An OBU generally refers to an electronic device installed in a vehicle that records traffic and driving data and can wirelessly connect to other devices. For example, OBUs may communicate with other OBUs mounted on other vehicles, with road-side units (RSUs), or vulnerable road users (VRUs), such as scooters, smart phones or watches of pedestrians, and other VRUs, over sidelink connections. In addition, OBUs may communicate with cellular networks and external data networks via cellular networks over a Uu connection.

Satellite communication may be complementary to or an alternative to an OBUs Uu/cellular link for ubiquitous connectivity. Satellite communication may be based on technologies specified in the 3$^{rd}$ Generation Partnership Project (3GPP) non-terrestrial network (NTN) specification or in private specifications. NTN may be able to support broadband service for various vehicle applications, from infotainment to advanced driver assistance system (ADAS)/ autonomous driving (AD). In order to accommodate broadband connectivity, a larger antenna size with narrower beams and higher gain may be implemented in OBUs to achieve the desired data rate. For example, a 20 cm×20 cm antenna for passenger cars may be required to achieve a data rate of more than 50 megabit per second (Mbps).

A vehicle's mobility may complicate satellite beam management. For example, a left or right turn may change the vehicle's beam direction if the elevation angle of the OBU/UE is not 90 degrees. In an example, with an 80 degree OBU/UE beam elevation, a left or right turn of the vehicle on a flat road may result in an approximately 14 degree change of absolute beam pointing direction. In addition, uphill and downhill movement may change the beam pointing direction irrespective of the OBU/UEs elevation. For example, there exist various highways that have a greater than 20% slope grape (e.g., 20%=11.3 degrees). A change in boresight pointing (beam pointing direction) may be sufficient for an OBU/UE with a narrower beam to lose the satellite connection (e.g., a 16×16 phased array generates a beam with a half-power beam width (HPBW) of approximately 6 degrees).

Various aspects of the disclosure provide mechanisms for predicting a beam direction change on an OBU/UE and to adjust the beam direction (e.g., adjust the beam with corresponding beam direction) of the transmit and/or receive beam on the OBU/UE in accordance with the predicted beam direction change. In some examples, the OBU/UE may predict the beam direction change based on one or more mobility parameters indicating a predicted change in the relative position of the OBU/UE with respect to an NTN entity (e.g., a satellite). In other examples, a network entity may predict the beam change direction based on the one or more mobility parameters. The network entity may correspond to the NTN entity (e.g., an aggregated or disaggregated base station on a satellite), a core network node (e.g., an access and mobility management function (AMF) or location management function (LMF)) or an application layer server (e.g., a vehicle-to-everything (V2X) application server or an ADAS/AD server).

The one or more mobility parameters may include, for example, the current location of the OBU/UE, route information indicating a route of the OBU/UE, and/or road infrastructure information indicating, for example, a number of lanes, a road curvature, or a road slope. The road infrastructure information may be ascertained, for example, from a digital map (e.g., a digital, high-definition map) that may be available to or stored on the OBU/UE and/or network entity. The one or more mobility parameters may further include at least one of a current beam direction of the OBU/UE, a location or elevation of the NTN entity, an antenna array size of the OBU/UE, or a half-power beam width of the OBU/UE. In other examples, the one or more mobility parameters may include an ephemeris and speed of the NTN entity. In this example, the one or more mobility parameters may further include the current location, route information, and/or road infrastructure information on top of the ephemeris and speed of the NTN entity.

In some examples, the OBU/UE may predict the beam direction change and send a request to the NTN entity to trigger an uplink beam measurement. The NTN entity may then provide a configuration of one or more uplink reference signals (e.g., a sounding reference signal (SRS) configuration) for the OBU/UE to use in transmitting the one or more uplink reference signals to the NTN entity. Based on the received uplink reference signals, the NTN entity may identify an adjusted beam direction and provide an indication of the adjusted beam direction to the OBU/UE. For example, the beam direction adjustment indication may be expressed in an OBU/UE local coordinate system or a global coordinate system. In some examples, the beam direction adjustment includes a beam identifier indicating a coefficient of a spatial filter or phase to be applied by a phase shifter on the OBU/UE to produce an adjusted beam having the adjusted beam direction. In other examples, the OBU/UE may directly determine and apply the beam direction adjustment based on the mobility parameters.

In some examples, the NTN entity may predict the beam direction change and trigger the uplink beam measurement to identify the beam direction adjustment. In other examples, the NTN entity may determine the beam direction adjustment based on the mobility parameters and provide an indication of the beam direction adjustment to the OBU/UE. In either example, the NTN entity may have access to the road infrastructure information and route information or may receive the road infrastructure information and route information from the OBU/UE. In addition, the current location (e.g., geo-coordinates) of the OBU/UE may be provided to the NTN entity or the NTN entity may calculate the UE's real-time (current) location via any available positioning algorithm.

By predicting a beam direction change at the OBU/UE and proactively adjusting the beam direction in response to the predicted beam direction change, there may be a reduced delay in beam adjustment/realignment caused by vehicle dynamics and/or road conditions. Moreover, the overhead in wireless signaling may be reduced by preventing satellite link loss and reestablishment.

The various concepts presented throughout this disclosure may be implemented across a broad variety of telecommunication systems, network architectures, and communication standards. Referring now to FIG. 1, as an illustrative example without limitation, a schematic illustration of a wireless communication network including a radio access network (RAN) 100 and a core network 160 is provided. The RAN 100 may implement any suitable wireless communication technology or technologies to provide radio access. As one example, the RAN 100 may operate according to 3$^{rd}$ Generation Partnership Project (3GPP) New Radio (NR) specifications, often referred to as 5G. As another example, the RAN 100 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. In other examples, the RAN 100 may operate according to a hybrid of 5G NR and 6G, may operate according to 6G, or may operate according to other future radio access technology (RAT). Of course, many other examples may be utilized within the scope of the present disclosure.

The geographic region covered by the RAN 100 may be divided into a number of cellular regions (cells) that can be uniquely identified by a user equipment (UE) based on an identification broadcasted over a geographical area from one access point or network entity. FIG. 1 illustrates cells 102, 104, 106, 108, and 110 each of which may include one or more sectors (not shown). A sector is a sub-area of a cell. All sectors within one cell are served by the same network entity. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective network entity serves each cell. Broadly, a network entity is responsible for radio transmission and reception in one or more cells to or from a UE. A network entity may also be referred to by those skilled in the art as a base station, base transceiver station (BTS), a radio base station, a radio transceiver, a transceiver function, a basic service set (BSS), an extended service set (ESS), an access point (AP), a Node B (NB), an evolved NB (eNB), a 5G NB (gNB), a transmission receive point (TRP), or some other suitable terminology. In some examples, a network entity may include two or more TRPs that may be collocated or non-collocated. Each TRP may communicate on the same or different carrier frequency within the same or different frequency band. In examples where the RAN 100 operates according to both the LTE and 5G NR standards, one of the network entities may be an LTE network entity, while another network entity may be a 5G NR network entity.

In some examples, the RAN 100 may employ an open RAN (O-RAN) to provide a standardization of radio interfaces to procure interoperability between component radio equipment. For example, in an O-RAN, the RAN may be disaggregated into a centralized unit (CU), a distributed unit (DU), and a radio unit (RU). The RU is configured to transmit and/or receive (RF) signals to and/or from one or more UEs. The RU may be located at, near, or integrated with, an antenna. The DU and the CU provide computational functions and may facilitate the transmission of digitized radio signals within the RAN 100. In some examples, the DU may be physically located at or near the RU. In some examples, the CU may be located near the core network 160.

The DU provides downlink and uplink baseband processing, a supply system synchronization clock, signal processing, and an interface with the CU. The RU provides downlink baseband signal conversion to an RF signal, and uplink RF signal conversion to a baseband signal. The O-RAN may include an open fronthaul (FH) interface between the DU and the RU. Aspects of the disclosure may be applicable to an aggregated RAN and/or to a disaggregated RAN (e.g., an O-RAN).

Various network entity arrangements can be utilized. For example, in FIG. 1, network entities 114, 116, and 118 are shown in cells 102, 104, and 106; and another network entity 122 is shown controlling a remote radio head (RRH) 122 in cell 110. That is, a network entity can have an integrated antenna or can be connected to an antenna or RRH by feeder cables. In the illustrated example, the cells 102, 104, 106, and 110 may be referred to as macrocells, as the network entities 114, 116, 118, and 122 support cells having a large size. Further, a network entity 120 is shown in the cell 108 which may overlap with one or more macrocells. In this example, the cell 108 may be referred to as a small cell (e.g., a microcell, picocell, femtocell, home base station, home Node B, home eNode B, etc.), as the network entity 120 supports a cell having a relatively small size. Cell sizing can be done according to system design as well as component constraints.

It is to be understood that the RAN 100 may include any number of network entities and cells. Further, a relay node may be deployed to extend the size or coverage area of a given cell. In some examples, a cell may not necessarily be stationary, and the geographic area of the cell may move according to the location of a mobile network entity.

FIG. 1 further includes an unmanned aerial vehicle (UAV) 156, which may be a drone or quadcopter. The UAV 156 may be configured to function as a network entity, or more specifically as a mobile network entity. That is, in some examples, a cell may not necessarily be stationary, and the geographic area of the cell may move according to the location of a mobile base station such as the UAV 156.

In addition to other functions, the network entities 114, 116, 118, 120, and 122*a*/122*b* may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The network entities 114, 116, 118, 120, and 122*a*/122*b* may communicate directly or indirectly (e.g., through the core network 170) with each other over backhaul links 152 (e.g., X2 interface). The backhaul links 152 may be wired or wireless.

The RAN 100 is illustrated supporting wireless communication for multiple mobile apparatuses. A mobile apparatus is commonly referred to as user equipment (UE) in standards and specifications promulgated by the 3$^{rd}$ Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quadcopter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 124, 126, and 144 may be in communication with network entity 114; UEs 128 and 130 may be in communication with network entity 116; UEs 132 and 134 may be in communication with network entity 118; UE 140 may be in communication with network entity 120; UE 142 may be in communication with network entity 122*b* via RRH 122*a*; and UE 158 may be in communication with mobile network entity 156. Here, each network entity 114, 116, 118, 120, 122*a*/122*b*, and 156 may be configured to provide an access point to the core network 170 (not shown) for all the UEs in the respective cells. In another example, a mobile network node (e.g., UAV 156) may be configured to function as a UE. For example, the UAV 156 may operate within cell 104 by communicating with network entity 116. UEs may be located anywhere within a serving cell. UEs that are located closer to a center of a cell (e.g., UE 132) may be referred to as cell center UEs, whereas UEs that are located closer to an edge of a cell (e.g., UE 134) may be referred to as cell edge UEs. Cell center UEs may have a higher signal quality (e.g., a higher reference signal received power (RSRP) or signal- to interference-plus-noise ratio (SINR)) than cell edge UEs.

In the RAN 100, the ability for a UE to communicate while moving, independent of their location, is referred to as mobility. The various physical channels between the UE and the RAN are generally set up, maintained, and released under the control of an access and mobility management function (AMF) (e.g., AMF 162), which may include a security context management function (SCMF) that manages the security context for both the control plane and the user plane functionality and a security anchor function (SEAF) that performs authentication. In some examples, during a call with a network entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE May undertake a handoff or handover from the serving cell to the neighboring (target) cell. For example, UE 126 may move from the geographic area corresponding to its serving cell 102 to the geographic area corresponding to a neighbor cell 106. When the signal strength or quality from the neighbor cell 106 exceeds that of its serving cell 102 for a given amount of time, the UE 126 may transmit a reporting message to its serving network entity 114 indicating this condition. In response, the UE 126 may receive a handover command, and the UE may undergo a handover to the cell 106.

Wireless communication between a RAN 100 and a UE (e.g., UE 124, 126, or 144) may be described as utilizing communication links 148 (e.g., Uu/cellular communication links) over an air interface. Transmissions over the communication links 148 between the network entities and the UEs may include uplink (UL) (also referred to as reverse link) transmissions from a UE to a network entity and/or downlink (DL) (also referred to as forward link) transmissions from a network entity to a UE. For example, DL transmissions may include unicast or broadcast transmissions of control information and/or data (e.g., user data traffic or other type of traffic) from a network entity (e.g., network entity 114) to one or more UEs (e.g., UEs 124, 126, and 144), while UL transmissions may include transmissions of control information and/or traffic information originating at a UE (e.g., UE 124). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

The communication links 148 may use multiple-input and multiple-output (MIMO) antenna technology, including spatial multiplexing, beamforming, and/or transmit diversity. For example, as shown in FIG. 1, network entity 122*a*/122*b* may transmit a beamformed signal to the UE 142 via one or more beams 174 in one or more transmit directions. The UE 142 may further receive the beamformed signal from the network entity 122*a*/122*b* via one or more beams 174' in one or more receive directions. The UE 142 may also transmit a beamformed signal to the network entity 122*a*/122*b* via the one or more beams 174' in one or more transmit directions. The network entity 122*a*/122*b* may further receive the beamformed signal from the UE 142 via the one or more beams 174 in one or more receive directions. The network entity 122*a*/122*b* and the UE 142 may perform beam training to determine the best transmit and receive beams 174/174' for communication between the network entity 122*a*/122*b* and the UE 142. The transmit and receive beams for the network entity 122*a*/122*b* may or may not be the same. The transmit and receive directions for the UE 142 may or may not be the same.

The communication links 148 may utilize one or more carriers. The network entities and UEs may use spectrum up to Y MHZ (e.g., 5, 10, 15, 20, 100, 400, etc. MHZ) bandwidth per carrier allocated in a carrier aggregation of up to a total of Yx MHZ (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The communication links 148 in the RAN 100 may further utilize one or more multiplexing and multiple access algorithms to enable simultaneous communication of the various devices. For example, 5G NR specifications provide multiple access for UL or reverse link transmissions from UEs 124, 126, and 144 to network entity 114, and for multiplexing DL or forward link transmissions from the network entity 114 to UEs 124, 126, and 144 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the network entity 114 to UEs 124, 126, and 144 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the communication links 148 in the RAN 100 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex (FD).

In various implementations, the communication links 148 in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The electromagnetic spectrum is often subdivided, based on frequency/wavelength, into various classes, bands, channels, etc. In 5G NR two initial operating bands have been identified as frequency range designations FR1 (410 MHZ-7.125 GHZ) and FR2 (24.25 GHZ-52.6 GHZ). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHZ) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHZ. For example, three higher operating bands have been identified as frequency range designations FR4-a or FR4-1 (52.6 GHZ-71 GHZ), FR4 (52.6 GHZ-114.25 GHZ), and FR5 (114.25 GHZ-300 GHZ). Each of these higher frequency bands falls within the EHF band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In some examples, access to the air interface may be scheduled, wherein a network entity 114 allocates resources for communication among some or all devices and equipment within its service area or cell. Within the present disclosure, as discussed further below, the network entity may be responsible for scheduling, assigning, reconfiguring, and releasing resources for one or more scheduled entities. That is, for scheduled communication, UEs (e.g., UE 124) may utilize resources allocated by the network entity 114.

Network entities are not the only entities that may function as scheduling entities. That is, in some examples, a UE may function as a scheduling entity, scheduling resources for one or more other UEs. For example, two or more UEs (e.g., UEs 144 and 146) may communicate with each other using peer to peer (P2P) or sidelink signals via a sidelink 150 therebetween without relaying that communication through a network entity (e.g., network entity 114). In some examples, the UEs 144 and 146 may each function as a transmitting sidelink device and/or a receiving sidelink device to communicate sidelink signals therebetween without relying on scheduling or control information from a network entity (e.g., network entity 114). In other examples, the network entity 114 may allocate resources to the UEs 144 and 146 for sidelink communication. For example, the UEs 144 and 146 may communicate using sidelink signaling in a P2P network, a device-to-device (D2D) network, vehicle-to-vehicle (V2V) network, a vehicle-to-everything (V2X), a mesh network, or other suitable network.

In some examples, a D2D relay framework may be included within a cellular network to facilitate relaying of communication to/from the network entity 114 via D2D links (e.g., sidelink 150). For example, one or more UEs (e.g., UE 144) within the coverage area of the network entity 114 may operate as a relaying UE to extend the coverage of the network entity 114, improve the transmission reliability to one or more UEs (e.g., UE 146), and/or to allow the network entity to recover from a failed UE link due to, for example, blockage or fading.

The wireless communications system may further include a Wi-Fi access point (AP) 176 in communication with Wi-Fi stations (STAs) 178 via communication links 180 in a 5 GHz unlicensed frequency spectrum. When communicating in an unlicensed frequency spectrum, the STAs 170/AP 176 may perform a clear channel assessment (CCA) prior to communicating in order to determine whether the channel is available.

The network entities 114, 116, 118, 120, and 122*a*/122*b* provide wireless access points to the core network 160 for any number of UEs or other mobile apparatuses via core network backhaul links 154. The core network backhaul links 154 may provide a connection between the network entities 114, 116, 118, 120, and 122*a*/122*b* and the core network 170. In some examples, the core network backhaul links 154 may include backhaul links 152 that provide interconnection between the respective network entities. The core network may be part of the wireless communication system and may be independent of the radio access technology used in the RAN 100. Various types of backhaul interfaces may be employed, such as a direct physical connection (wired or wireless), a virtual network, or the like using any suitable transport network.

The core network 160 may include an Access and Mobility Management Function (AMF) 162, other AMFs 168, a Session Management Function (SMF) 164, and a User Plane Function (UPF) 166. The AMF 162 may be in communication with a Unified Data Management (UDM) 170. The AMF 162 is the control node that processes the signaling between the UEs and the core network 160. Generally, the AMF 162 provides QoS flow and session management. All user Internet protocol (IP) packets are transferred through the UPF 166. The UPF 166 provides UE IP address allocation as well as other functions. The UPF 166 is configured to couple to IP Services 172. The IP Services 172 may include the Internet, an intranet, an IP Multimedia Subsystem (IMS), a PS Streaming Service, and/or other IP services. The core network 160 may further include other core network entities, such as a policy control function (PCF), application function (AF), network slice selection function (NSSF), authentication server function (AUSF), and a location management function (LMF), The RAN 100 may be, for example, a terrestrial RAN, as shown in FIG. 1. In addition, the wireless communication system may further include a non-terrestrial RAN 186 that includes one or more non-terrestrial network (NTN) entities 188 (e.g., one or more satellites). In some examples, a UE (e.g., 126) and the NTN entity 188 may be configured for NTN (e.g., satellite) communication via an NTN (satellite) link 190. In addition, the UE 126 may further be configured for Uu/cellular communication and/or D2D (e.g., V2X) communication. For example, the UE 126 may be a vehicle on-board unit (OBU) that may be configured to communicate with other OBUs (e.g., UE 132 mounted on other vehicles), road-side units (RSUs), or vulnerable road users (VRUs) via a sidelink 150 and may further be configured to communicate with the network entity 114 via a Uu/cellular communication link 148.

In some examples, the UE 126 and NTN entity 188 may be configured to communicate using beamforming. For example, the UE 126 may include an antenna with a larger antenna size than a handheld UE that provides a narrower beam and higher gain to achieve the desired data rate for satellite communication. The vehicle's mobility may cause the UE 126 to lose the satellite link 190, thus increasing the complexity of UE beam management.

Therefore, the UE 126 and NTN entity 188 may each include a respective beam manager 182 and 184 configured to predict a beam direction change on the UE 126 and to adjust the beam direction (e.g., adjust the beam with corresponding beam direction) of the transmit and/or receive beam on the UE 126 in accordance with the predicted beam direction change. In some examples, the beam manager 182 at the UE 126 may predict the beam direction change based on one or more mobility parameters indicating a predicted change in the relative position of the UE 126 with respect to the NTN entity 188. In other examples, the beam manager at the NTN entity 188 may predict the beam change direction based on the one or more mobility parameters. Although the beam manager 184 is illustrated as being included within the NTN entity 188, in other examples, the beam manager 184 may be included within another network entity associated with the NTN entity. For example, the other network entity may be a core network node (e.g., an AMF or LMF) or an application layer server (e.g., a V2X application server or advanced driver assistance system (ADAS)/autonomous driving (AD) application server).

For example, the one or more mobility parameters may include the current location of the UE, route information indicating a route of the UE, and/or road infrastructure information indicating, for example, a number of lanes, a road curvature, or a road slope. The road infrastructure information may be ascertained, for example, from a digital map (e.g., a digital, high-definition map). The one or more mobility parameters may further include at least one of a current beam direction of the UE, a location or elevation of the NTN entity 188, an antenna array size of the UE 126, or a half-power beam width of the UE 126. In other examples, the one or more mobility parameters may include an ephemeris and speed of the NTN entity 188. In this example, the one or more mobility parameters may further include the current location, route information, and/or road infrastructure information on top of the ephemeris and speed of the NTN entity 188.

In some examples, the beam manager 182 on the UE 126 may predict the beam direction change and send a request to the NTN entity 188 to trigger an uplink beam measurement. The beam manager 184 on the NTN entity 188 may then provide a configuration of one or more uplink reference signals (e.g., a sounding reference signal (SRS) configuration) for the UE 126 to use in transmitting the one or more uplink reference signals to the NTN entity 188. Based on the received uplink reference signals, the beam manager 184 on the NTN entity 188 may identify an adjusted beam direction and provide an indication of the adjusted beam direction to the UE 126. For example, the beam direction adjustment indication may be expressed in a UE local coordinate system or a global coordinate system. In some examples, the beam direction adjustment includes a beam identifier indicating a coefficient of a spatial filter or phase to be applied by a phase shifter on the UE 126 to produce an adjusted beam having the adjusted beam direction. In other examples, the beam manager 182 on the UE 126 may directly determine and apply the beam direction adjustment based on the mobility parameters.

In some examples, the beam manager 184 on the NTN entity 188 may predict the beam direction change and trigger the uplink beam measurement to identify the beam direction adjustment. In other examples, the beam manager 184 on the NTN entity 188 may determine the beam direction adjustment based on the mobility parameters and provide an indication of the beam direction adjustment to the UE 126. In either example, the beam manager 184 on the NTN entity 188 may have access to the road infrastructure information and route information or may receive the road infrastructure information and route information from the UE 126. In addition, the current location (e.g., geo-coordinates) of the UE 126 may be provided to the beam manager 184 on the NTN entity 188 or the NTN entity 188 may calculate the UE's real-time (current) location via any available positioning algorithm.

Figure 2:
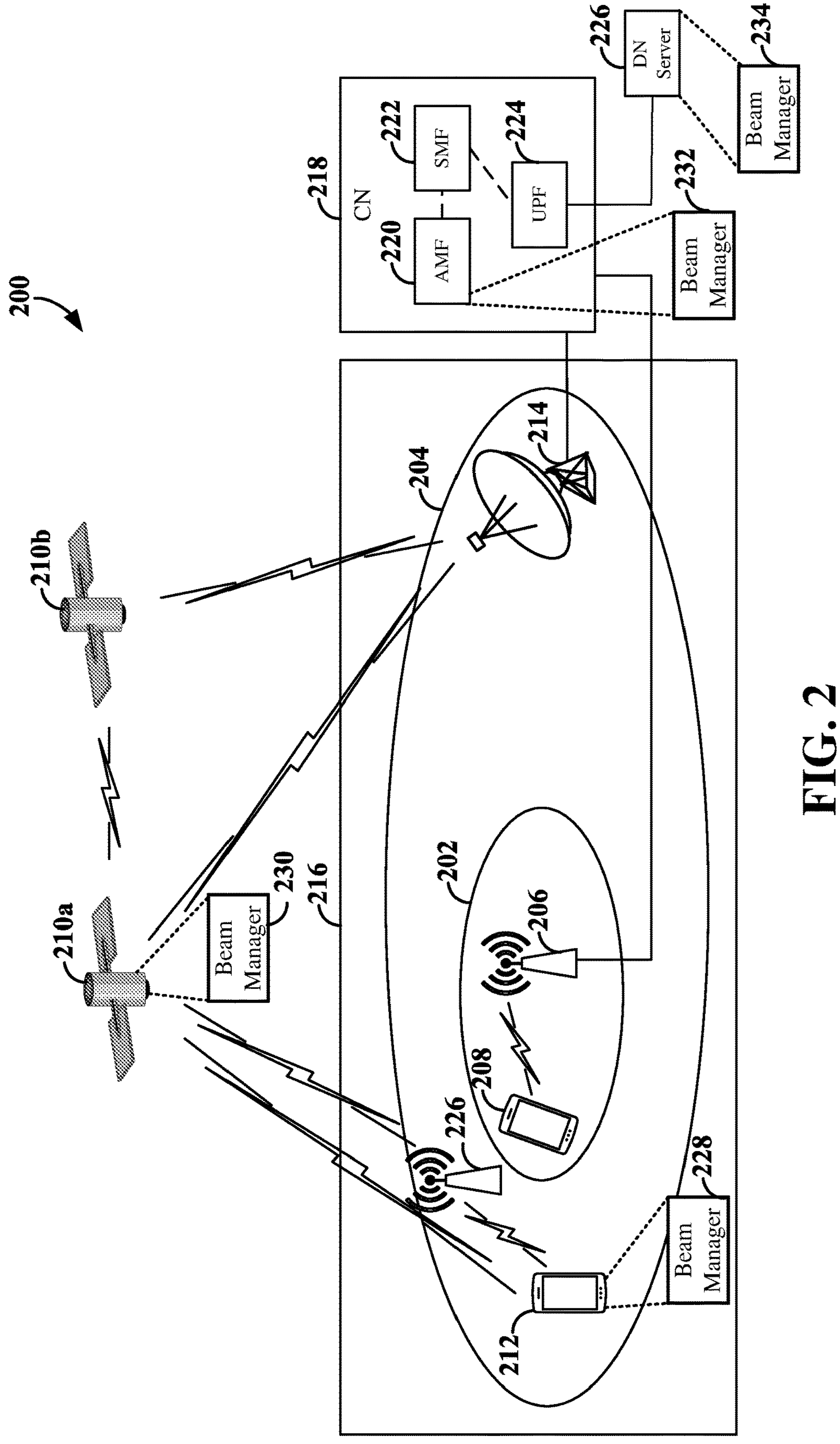
FIG. 2 is a diagram illustrating a wireless communication system including a terrestrial RAN and a non-terrestrial RAN according to some aspects.

FIG. 2 is a diagram illustrating a wireless communication system 200 including a terrestrial RAN 202 and a non-terrestrial RAN 204 according to some aspects. The wireless communication system 200 may be a 5G wireless communication system (5GS) or 6GS, which may correspond to, for example, the wireless communication system illustrated in FIG. 1. Each of the terrestrial RAN 202 and the non-terrestrial RAN 204 may be associated with a respective geographical area. Thus, each of the terrestrial RAN 202 and the non-terrestrial RAN 204 may provide 5G or 6G services within the corresponding respective geographical area. The terrestrial RAN 202 may correspond, for example, to the RAN 100 illustrated in FIG. 1. For example, the terrestrial RAN 202 may include one or more network entities 206 (one of which is shown for convenience), each serving one or more UEs 208. The terrestrial RAN 202 may further be coupled to a core network (CN) 218 for communication of user plane and control plane signaling and data.

In some examples, the non-terrestrial RAN 204 may include a satellite (NTN entity) 210*a* operating as a network entity (e.g., gNB (NG-RAN)) to serve one or more UEs 212 within a satellite coverage area. In some examples, the satellite coverage area may include one or more fixed tracking areas (TAs), each including one or more cells (not shown) served by the satellite 210*a*. Each cell may be defined with respect to a fixed or moving satellite beam spot, depending on the type of satellite. For example, the satellite 210*a* may be a low earth orbit (LEO) satellite, a medium earth orbit (MEO) satellite, or a geostationary earth orbit (GEO) satellite. LEO satellites may orbit the Earth with an altitude between 300 kilometers (km) and 2,000 km and produce a beam footprint size between 100 km and 500 km. MEO satellites may orbit the Earth with an altitude between 8,000 km and 25,000 km and produce a beam footprint size between 100 km and 500 km. GEO satellites may orbit the Earth with an altitude of 35,786 km and produce a beam footprint size between 200 and 1,000 km.

In other examples, the non-terrestrial RAN 204 may include one or more terrestrial network entities 426, one of which is shown for convenience, and the satellite 210*a* may provide a backhaul link to the core network 218. In this example, the non-terrestrial network 204 includes both terrestrial and non-terrestrial RAN components. The non-terrestrial RAN 204 further includes a satellite gateway (or Earth station) 214 to relay control plane and user plane communication between the satellite 210*a* and the CN 218. In some examples, the satellite 210*a* may route communication to/from the satellite gateway 214 through one or more additional satellites 210*b* via inter-satellite links (ISLs).

Figure 4:
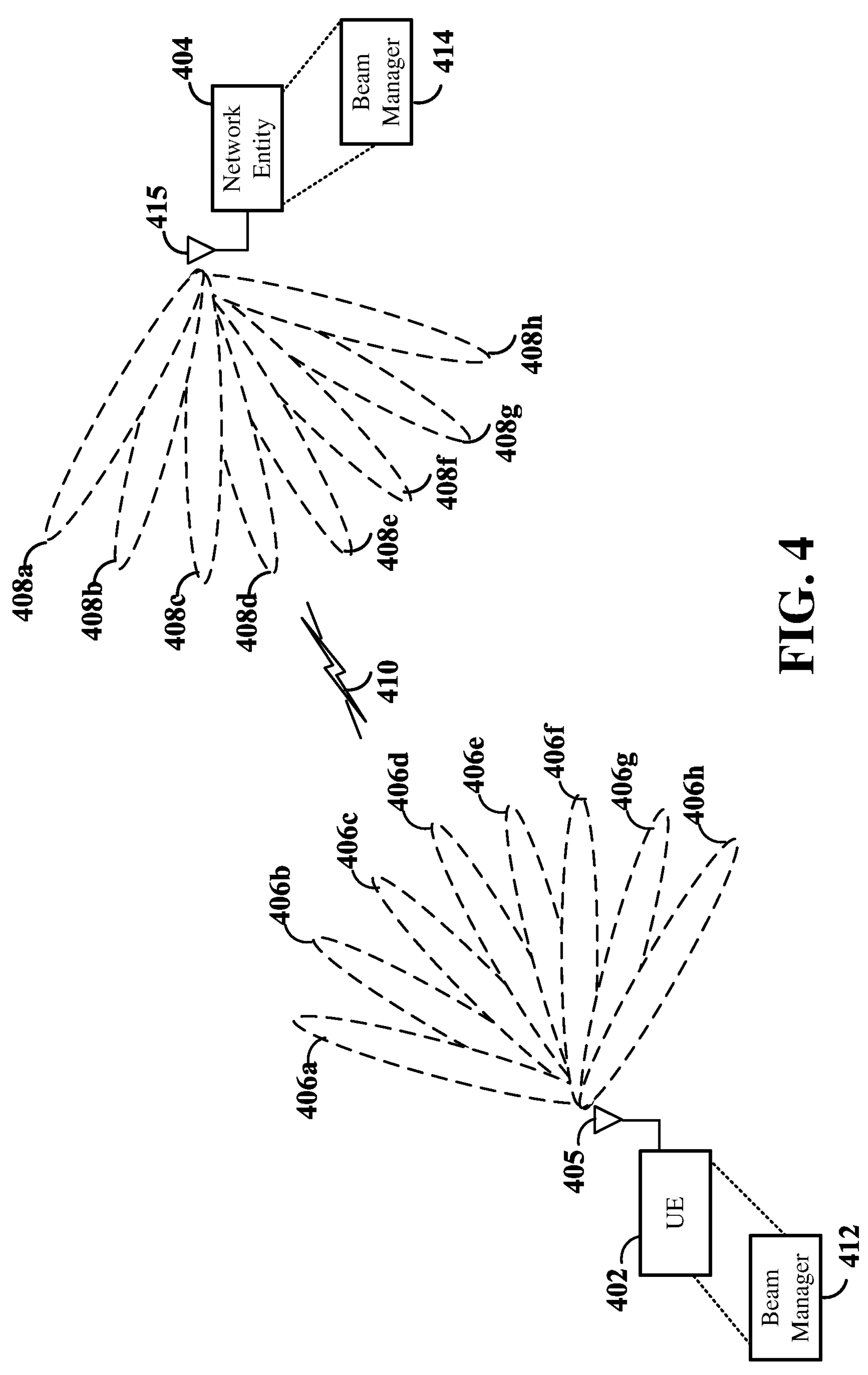
FIG. 4 is a diagram illustrating communication between a network entity and a UE using beamformed signals according to some aspects.

In the example shown in FIG. 4, the terrestrial RAN 202 and non-terrestrial RAN 204 are included within the same registration area 216 (e.g., NAS registration area). The registration area 216 may include a number of TAs within which a UE 208 or 212 may roam without performing an updated location registration. For example, as shown in FIG. 2, the registration area 216 may be the same for both UE 208 and UE 212. In other examples, the respective registration areas for UEs 208 and 212 may be different based on the different mobility patterns of the UEs 208 and 212. In some examples, a single registration area 216 of a UE (e.g., UE 208) may include each of the terrestrial and non-terrestrial RANs 202 and 204 (as shown in FIG. 2). In other examples, the terrestrial RAN 202 and non-terrestrial RAN 204 may be included in separate registration areas of the UE 208. In some examples, one or both of the terrestrial and non-terrestrial RANs 202 and 204 may include two or more registration areas of the UE 208.

The CN 218 may include an AMF 220, SMF 222, and UPF 224, as described above in connection with FIG. 1. The UPF 224 may be configured to provide user plane connectivity to route PDUs (or packets) between the UEs 208 and 212 and one or more external data networks (e.g., data network (DN) server 226) via the RANs 202 and 204. The AMF 220 and SMF 222 may be configured to provide control plane connectivity to perform NAS signaling with each of the UEs 208 and 212 via the RANs 202 and 204. For example, the AMF 220 may perform various mobility management procedures, such as registration and service request procedures, with the UEs 208 and 212, while the SMF 222 may perform various session management procedures, such as PDU session establishment, PDU session modification, and PDU session release procedures, with the UEs 208 and 212 via the AMF 220.

In some examples, the UE 212 and NTN entity (satellite) 210*a* may be configured to communicate using beamforming. For example, the UE 212 and NTN entity 210*a* may each include a respective beam manager 228 and 238 configured to predict a beam direction change on the UE 212 and to adjust the beam direction (e.g., adjust the beam with corresponding beam direction) of the transmit and/or receive beam on the UE 212 in accordance with the predicted beam direction change. In some examples, the beam manager 229 at the UE 212 may predict the beam direction change based on one or more mobility parameters indicating a predicted change in the relative position of the UE 212 with respect to the NTN entity 210*a*. In other examples, the beam manager at the NTN entity 210*a* may predict the beam change direction based on the one or more mobility parameters. In other examples, instead of the NTN entity 210*a* including the beam manager 230, a network entity associated with the NTN entity 210*a* may include the beam manager. For example, a CN node (e.g., AMF 220) may include a beam manager 232 or the DN server 226 (e.g., a V2X application server or advanced driver assistance system (ADAS) application server) may include a beam manager 234, as described herein.

In some examples, the beam manager 228 on the UE 212 may predict the beam direction change and send a request to the beam manager 230, 232, or 234 on the network entity (e.g., the NTN entity 210*a*, AMF 220, or DN server 226) to trigger an uplink beam measurement. The beam manager 230, 232, or 234 on the network entity (e.g., the NTN entity 210*a*. AMF 220, or DN server 226) may then provide a configuration of one or more uplink reference signals (e.g., a sounding reference signal (SRS) configuration) for the UE 212 to use in transmitting the one or more uplink reference signals to the NTN entity 210*a*. Based on the received uplink reference signals, the beam manager 230, 232, or 234 may identify an adjusted beam direction and provide an indication of the adjusted beam direction to the UE 212. In other examples, the beam manager 228 on the UE 212 may directly determine and apply the beam direction adjustment based on the mobility parameters.

In some examples, the beam manager 230, 232, or 234 on the network entity (e.g., the NTN entity 210*a*, AMF 220, or DN server 226) may predict the beam direction change and trigger the uplink beam measurement to identify the beam direction adjustment. In other examples, the beam manager 230, 232, or 234 on the network entity (e.g., the NTN entity 210*a*, AMF 220, or DN server 226) may determine the beam direction adjustment based on the mobility parameters and provide an indication of the beam direction adjustment to the UE 212.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
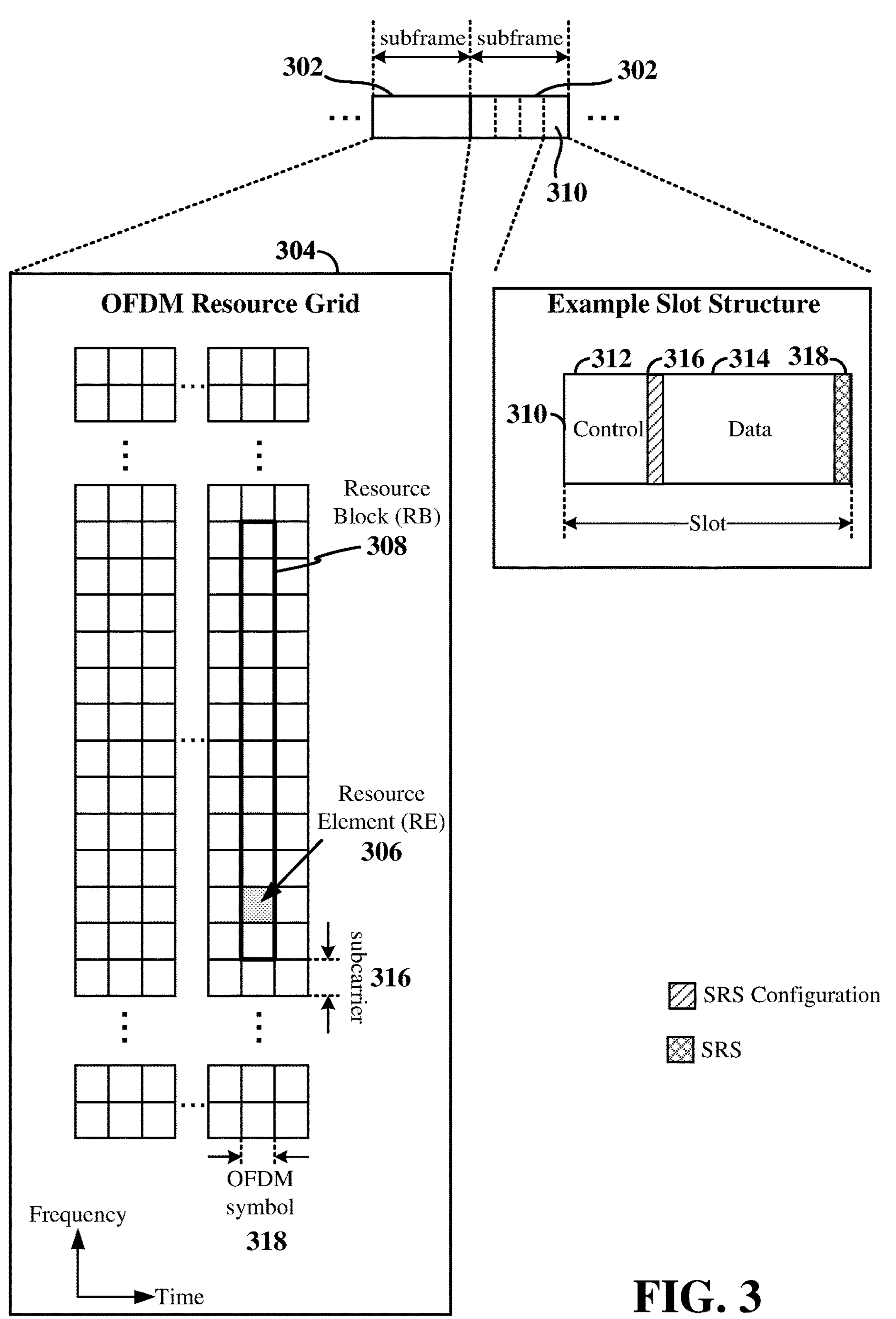
FIG. 3 is a diagram illustrating an example of an organization of wireless resources in an air interface utilizing orthogonal frequency divisional multiplexing (OFDM) according to some aspects.

Referring now to FIG. 3, an expanded view of an exemplary subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a network entity (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a network entity, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface or a satellite interface, for a DL transmission, the network entity may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgement (ACK) or negative acknowledgement (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The network entity may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A network entity may transmit other system information (OSI) as well.

In an UL transmission, the UE may utilize one or more REs 306 to carry UL control information (UCI) including one or more UL control channels, such as a physical uplink control channel (PUCCH), to the network entity. UCI may include a variety of packet types and categories, including pilots, reference signals, and information configured to enable or assist in decoding uplink data transmissions. Examples of uplink reference signals may include a sounding reference signal (SRS) (e.g., SRS 318) or an uplink DMRS. In some examples, the downlink control information (DCI) may include an SRS configuration 316 indicating one or more SRS resources, each providing time-frequency resources, uplink beam, uplink repetition pattern, and other suitable information, for transmission of one or more SRSs 318. In some examples, the UCI may include a scheduling request (SR), i.e., request for the network entity to schedule uplink transmissions. Here, in response to the SR transmitted on the UCI, the network entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs. In some examples, the PDSCH may carry a plurality of SIBs, not limited to SIB1, discussed above. For example, the OSI may be provided in these SIBs, e.g., SIB2 and above.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 3 are not necessarily all of the channels or carriers that may be utilized between devices, and those of ordinary skill in the art will recognize that other channels or carriers may be utilized in addition to those illustrated, such as other traffic, control, and feedback channels.

Beamforming is a signal processing technique that may be used at the transmitter and/or receiver to shape or steer an antenna beam (e.g., a transmit beam or receive beam) along a spatial path between the transmitter and the receiver. A network entity (e.g., gNB) may generally be capable of communicating with UEs using transmit beams (e.g., downlink transmit beams) of varying beam widths. The UE may further be configured to utilize one or more downlink receive beams to receive signals from the network entity. In some examples, to select one or more downlink transmit beams and one or more downlink receive beams for communication with a UE, the network entity may transmit a reference signal, such as an SSB or CSI-RS, on each of a plurality of downlink transmit beams in a beam-sweeping manner. The UE may measure the reference signal received power (RSRP) on each of the downlink transmit beams using one or more downlink receive beams on the UE and transmit a Layer 1 (L1) measurement report to the network entity indicating the RSRP of one or more of the measured downlink transmit beams. The network entity may then select one or more serving downlink beams (e.g., downlink transmit beams and downlink receive beams) for communication with the UE based on the L1 measurement report. The resulting selected downlink transmit beam and downlink receive beam may form a downlink beam pair link. In other examples, when the channel is reciprocal, the network may derive the particular downlink beam(s) to communicate with the UE based on uplink measurements of one or more uplink reference signals, such as sounding reference signals (SRSs).

Similarly, uplink beams (e.g., uplink transmit beam(s) at the UE and uplink receive beam(s) at the network entity) may be selected by measuring the RSRP of received uplink reference signals (e.g., SRSs) or downlink reference signals (e.g., SSBs or CSI-RSs) during an uplink or downlink beam sweep. For example, the network entity may determine the uplink beams either by uplink beam management via an SRS beam sweep with measurement at the network entity or by downlink beam management via an SSB/CSI-RS beam sweep with measurement at the UE. The selected uplink beam may be indicated by a selected SRS resource identifier (SRI) when implementing uplink beam management or a selected SSB/CSI-RS resource when implementing downlink beam management. For example, the selected SSB/CSI-RS resource can have a spatial relation to the selected uplink transmit beam (e.g., the uplink transmit beam utilized for the PUCCH, SRS, and/or PUSCH). The resulting selected uplink transmit beam and uplink receive beam may form an uplink beam pair link.

FIG. 4 is a diagram illustrating communication between a network entity 404 and a UE 402 using beamformed signals according to some aspects. The network entity 404 may be any of the network entities (e.g., gNBs) or NTN entities illustrated in FIGS. 1 and/or 2, and the UE 402 may be any of the UEs illustrated in FIGS. 1 and/or 2.

In the example shown in FIG. 4, the network entity 404 is configured to generate a plurality of beams 406*a*-406*h*, each associated with a different beam direction. In addition, the UE 402 is configured to generate a plurality of beams 408*a*-408*e*, each associated with a different beam direction. The network entity 404 and UE 402 may select one or more beams 406*a*-406*h* on the network entity 404 and one or more beams 408*a*-408*c* on the UE 402 for communication of uplink and downlink signals therebetween using a downlink beam management scheme and/or an uplink beam management scheme.

Beamforming may be achieved by combining the signals communicated via, for example, antennas 405 or 415 (e.g., antenna elements of an antenna array) such that some of the signals experience constructive interference while others experience destructive interference. To create the desired constructive/destructive interference, the UE 402 or network entity 404 may apply amplitude and/or phase offsets to signals transmitted or received from the antenna elements 405 or 415 associated with the UE 402 or network entity 404. In some examples, the antenna elements may be mapped to antenna ports for generation of beams. Here, the term antenna port refers to a logical port (e.g., a beam) over which a signal (e.g., a data stream or layer) may be transmitted. In an example of a base station, an antenna array may include 128 antenna elements (e.g., within a 16×8 array) that may be mapped to 32 antenna ports by an 8×1 combiner.

In an example of a downlink beam management scheme for selection of downlink beams, the network entity 404 may be configured to sweep or transmit on each of a plurality of downlink transmit beams 406*a*-406*h* during one or more synchronization slots. For example, the network entity 404 may transmit a reference signal, such as an SSB or CSI-RS, on each beam in the different beam directions during the synchronization slot. Transmission of the beam reference signals may occur periodically (e.g., as configured via radio resource control (RRC) signaling by the gNB), semi-persistently (e.g., as configured via RRC signaling and activated/deactivated via medium access control-control element (MAC-CE) signaling by the gNB), or aperiodically (e.g., as triggered by the gNB via downlink control information (DCI)). It should be noted that while some beams are illustrated as adjacent to one another, such an arrangement may be different in different aspects. For example, downlink transmit beams 406*a*-406*h* transmitted during a same symbol may not be adjacent to one another. In some examples, the network entity 404 may transmit more or less beams distributed in all directions (e.g., 360 degrees).

In addition, the UE 402 is configured to receive the downlink beam reference signals on a plurality of downlink receive beams 408*a*-408*c*. In some examples, the UE 402 searches for and identifies each of the downlink transmit beams 406*a*-406*h* based on the beam reference signals. The UE 402 then performs beam measurements (e.g., RSRP, SINR, RSRQ, etc.) on the beam reference signals on each of the downlink receive beams 408*a*-408*e* to determine the respective beam quality of each of the downlink transmit beams 406*a*-406*h* as measured on each of the downlink receive beams 408*a*-408*c*.

The UE 402 can generate and transmit an L1 measurement report, including the respective beam index (beam identifier (ID)) and beam measurement of one or more of the downlink transmit beam 406*a*-406*h* on one or more of the downlink receive beams 408*a*-408*c* to the network entity 404. The network entity 404 may then select one or more downlink transmit beams on which to transmit unicast downlink control information and/or user data traffic to the UE 402. In some examples, the selected downlink transmit beam(s) have the highest gain from the beam measurement report. In some examples, the UE 402 can further identify the downlink transmit beams selected by the network entity from the beam measurements. Transmission of the beam measurement report may occur periodically (e.g., as configured via RRC signaling by the gNB), semi-persistently (e.g., as configured via RRC signaling and activated/deactivated via MAC-CE signaling by the gNB), or aperiodically (e.g., as triggered by the gNB via DCI).

The network entity 404 or the UE 402 may further select a corresponding downlink receive beam on the UE 402 for each selected serving downlink transmit beam to form a respective downlink beam pair link (BPL) for each selected serving downlink transmit beam. For example, the UE 402 can utilize the beam measurements to select the corresponding downlink receive beam for each serving downlink transmit beam. In some examples, the selected downlink receive beam to pair with a particular downlink transmit beam may have the highest gain for that particular downlink transmit beam.

In one example, a single downlink transmit beam (e.g., beam 406*d*) on the network entity 404 and a single downlink receive beam (e.g., beam 408*c*) on the UE may form a single downlink BPL used for communication between the network entity 404 and the UE 402. In another example, multiple downlink transmit beams (e.g., beams 406*c*, 406*d*, and 406*c*) on the network entity 404 and a single downlink receive beam (e.g., beam 408*c*) on the UE 402 may form respective downlink BPLs used for communication between the network entity 404 and the UE 402. In another example, multiple downlink transmit beams (e.g., beams 406*c*, 406*d*, and 406*c*) on the network entity 404 and multiple downlink receive beams (e.g., beams 408*c* and 408*d*) on the UE 402 may form multiple downlink BPLs used for communication between the network entity 404 and the UE 402. In this example, a first downlink BPL may include downlink transmit beam 406*c* and downlink receive beam 408*c*, a second downlink BPL may include downlink transmit beam 408*d* and downlink receive beam 408*c*, and a third downlink BPL may include downlink transmit beam 408*e* and downlink receive beam 408*d*.

When the channel is reciprocal, the above-described downlink beam management scheme may also be used to select one or more uplink BPLs for uplink communication from the UE 402 to the network entity 404. For example, the downlink BPL formed of beams 406*d* and 408*e* may also serve as an uplink BPL. Here, beam 408*c* is utilized as an uplink transmit beam, while beam 406*d* is utilized as an uplink receive beam.

In an example of an uplink beam management scheme, the UE 402 may be configured to sweep or transmit on each of a plurality of uplink transmit beams 408*a*-408*c*. For example, the UE 402 may transmit an SRS on each beam in the different beam directions. In addition, the network entity 404 may be configured to receive the uplink beam reference signals on a plurality of uplink receive beams 406*a*-406*h*. In some examples, the network entity 404 searches for and identifies each of the uplink transmit beams 408*a*-408*e* based on the beam reference signals. The network entity 404 then performs beam measurements (e.g., RSRP, SINR, RSRQ, etc.) on the beam reference signals on each of the uplink receive beams 406*a*-406*h* to determine the respective beam quality of each of the uplink transmit beams 408*a*-408*e* as measured on each of the uplink receive beams 406*a*-406*h*.

The network entity 404 may then select one or more uplink transmit beams on which the UE 402 will transmit unicast downlink control information and/or user data traffic to the network entity 404. In some examples, the selected uplink transmit beam(s) have the highest gain. The network entity 404 may further select a corresponding uplink receive beam on the network entity 404 for each selected serving uplink transmit beam to form a respective uplink beam pair link (BPL) for each selected serving uplink transmit beam. For example, the network entity 404 can utilize the uplink beam measurements to select the corresponding uplink receive beam for each serving uplink transmit beam. In some examples, the selected uplink receive beam to pair with a particular uplink transmit beam may have the highest gain for that particular uplink transmit beam.

The network entity 404 may then notify the UE 402 of the selected uplink transmit beams. For example, the network entity 404 may provide the SRS resource identifiers (SRIs) identifying the SRSs transmitted on the selected uplink transmit beams. In some examples, the network entity 404 may apply each selected uplink transmit beam (and corresponding uplink receive beam) to an uplink signal (e.g., PUCCH, PUSCH, etc.) and transmit the respective SRIs associated with the selected uplink transmit beams applied to each uplink signal to the UE 402. When the channel is reciprocal, the above-described uplink beam management scheme may also be used to select one or more downlink BPLs for downlink communication from the network entity 404 to the UE 402. For example, the uplink BPLs may also be utilized as downlink BPLs.

In some examples, the network entity 404 is an NTN entity 404. In this example, the UE 402 and NTN entity 404 may each include a respective beam manager 412 and 414 configured to predict a beam direction change on the UE 402 and to adjust the beam direction (e.g., adjust the beam with corresponding beam direction) of the transmit and/or receive beam on the UE 402 in accordance with the predicted beam direction change. In some examples, the beam manager 412 at the UE 402 may predict the beam direction change based on one or more mobility parameters indicating a predicted change in the relative position of the UE 402 with respect to the NTN entity 404. In other examples, the beam manager 414 at the NTN entity 404 may predict the beam change direction based on the one or more mobility parameters. In other examples, instead of the NTN entity 404 including the beam manager 414, a network entity (e.g., a CN node or DN server) associated with the NTN entity 404 may include the beam manager.

In some examples, the beam manager 412 on the UE 402 may predict the beam direction change and send a request to the beam manager 414 on the NTN entity 404 to trigger an uplink beam measurement. The beam manager 414 on the NTN entity 404 may then provide a configuration of one or more uplink reference signals (e.g., a sounding reference signal (SRS) configuration) for the UE 402 to use in transmitting the one or more uplink reference signals to the NTN entity 404. Based on the received uplink reference signals, the beam manager 414 may identify an adjusted beam direction and provide an indication of the adjusted beam direction to the UE 402. In other examples, the beam manager 412 on the UE 402 may directly determine and apply the beam direction adjustment based on the mobility parameters.

In some examples, the beam manager 414 on the NTN entity 404 may predict the beam direction change and trigger the uplink beam measurement to identify the beam direction adjustment. In other examples, the beam manager 414 on the NTN entity 404 may determine the beam direction adjustment based on the mobility parameters and provide an indication of the beam direction adjustment to the UE 402.

Figure 5:
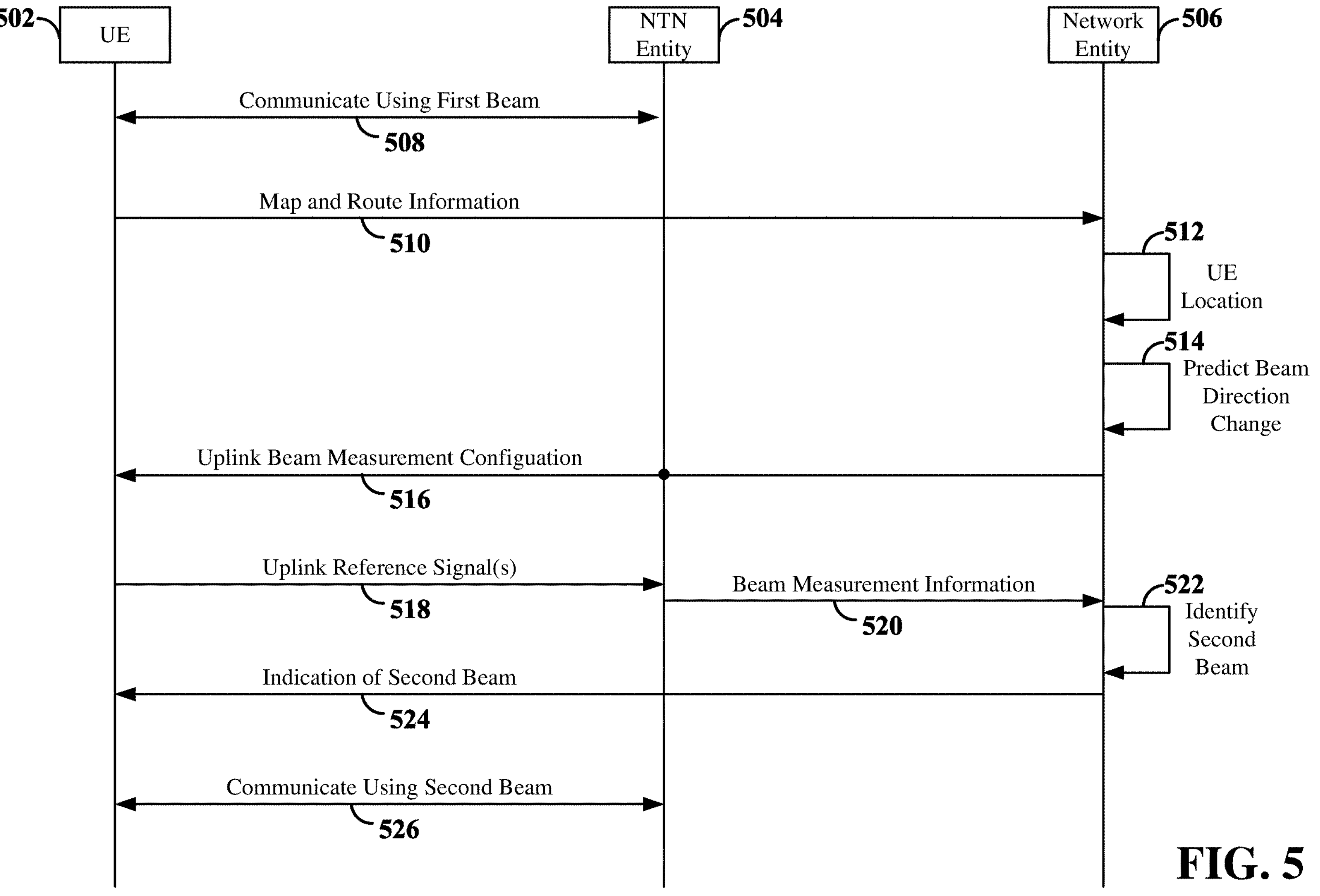
FIG. 5 is a diagram illustrating exemplary signaling for beam management in NTN communication according to some aspects.

FIG. 5 is a diagram illustrating exemplary signaling between a UE 502, a NTN entity 504, and a network entity 506 for beam management in NTN communication according to some aspects. The NTN entity 504 may correspond, for example, to any of the NTN entities illustrated in FIGS. 1, 2 and/or 4. In some examples, the network entity 506 may be a gNB (NG-RAN) within the NTN entity 504. In other examples, the network entity 506 may be a core network (5GC) entity (e.g., AMF, LMF, etc.) or an application layer network entity (e.g., an ADAS application server, V2X server, etc.). The UE 502 may correspond, for example, to any of the UEs illustrated in FIGS. 1, 2, and/or 4. For example, the UE 502 may be an OBU of a vehicle.

At 508, the UE 502 and NTN entity 504 may communicate via a satellite link using a first beam (e.g., Tx and/or Rx beam) at the UE. The first beam may have a first beam direction selected based on a spatial filter coefficient and/or phase applied by a phase shifter associated with an antenna array of the UE 502.

At 510, the UE 502 may optionally transmit map information and route information to the network entity 506. The route information may indicate, for example, a route of the UE 502 (e.g., a planned path to be taken by the UE). The route information may further indicate a current heading (e.g., direction in a local or global coordinate system), speed, and/or destination of the UE 502. The map information may include, for example, road infrastructure information obtained from a digital map (e.g., high definition (HD) map) accessed by the UE 502. For example, the digital/HD map may be stored on the UE and/or updated via the network. The road infrastructure information map indicate one or more of a number of lanes, a road curvature, or a road slope related to the route of the UE 502. In some examples, the network entity 506 may have access to the digital/HD map (e.g., in an ADAS server or other network entity). In this example, the UE 502 may not provide the map information to the network entity 506.

At 512, the network entity 506 may determine the current location of the UE 502 (e.g., within a local coordinate system or global coordinate system). In some examples, the UE 502 may provide the UE's real-time (current) location (e.g., geo-coordinates) to the network entity 506. For example, the UE 502 may transmit the current location to the network entity 506 together with the route information and/or map information. In other examples, the network entity 506 may determine the UE's current location via positioning (e.g., using any available positioning method, such as round trip time (RTT), time difference of arrival (TDOA), or angle-based positioning). In an example, the current location of the UE 502 may be calculated by the LMF in the core network. For example, the LMF can receive measurements and assistance information from the NG-RAN and the UE 502 via the AMF to compute the position of the UE 502. In some examples, the LMF may be the network entity 506. In other examples, the LMF may assist the network entity 506 in determining the UE's current location.

At 514, the network entity 506 may predict a beam direction change at the UE 502 based on a predicted change in a relative position of the UE 502 with respect to the NTN entity 504. The beam direction change may be predicted in accordance with one or more mobility parameters indicating the predicted change in the relative position of the UE 502 with respect to the NTN entity 504. In some examples, the mobility parameter(s) may include the current location of the UE 502, the route information, and/or the road infrastructure information. In some examples, the mobility parameter(s) may further include the first beam direction of the UE 502, a location or elevation of the NTN entity 504, an antenna array size of the UE 502, and/or a half-power beam width of the UE 502. In some examples, the mobility parameters may include an ephemeris and speed of the NTN entity 504. In this example, the current location of the UE 502, the route information, and/or the road infrastructure information, along with other mobility parameters, may be applied on top of the ephemeris and speed of the NTN entity 504 to identify the predicted beam direction change.

At 516, the network entity 506 may optionally provide an uplink beam measurement configuration to the UE 502 via the NTN entity 504. The uplink beam measurement configuration may include, for example, a configuration of one or more uplink reference signals to be transmitted by the UE 502. For example, the uplink beam measurement configuration may include one or more SRS resources or a range of potential beam direction change for the UE 502 to determine the spatial filters for SRS transmissions. In some examples, the network entity 506 may request the NTN entity 504 to generate and provide the uplink beam measurement configuration to the UE 502.

At 518, the UE 502 may optionally transmit the one or more uplink reference signals (e.g., one or more SRSs) based on the configuration (e.g., in accordance with the SRS resources or range). The NTN entity 504 may perform beam measurements (e.g., reference signal received power (RSRP) or signal-to-interference-plus-noise ratio (SINR) measurements) on the received uplink reference signals, and at 520, provide beam measurement information to the network entity 506. In some examples, the beam measurement information may indicate the measured RSRP or SINR of each of the received SRSs.

At 522, the network entity 506 may identify a second beam (e.g., a Tx and/or Rx) beam for the UE 502 to communicate with the NTN entity 504. The second beam has a second beam direction in accordance with the predicted beam change. In some examples, the second beam may be identified based on the beam measurement information obtained from the uplink beam measurement of received SRSs. In other examples, the second beam may be directly identified based on the one or more mobility parameters. For example, the network entity 506 may determine a beam direction adjustment to the first beam direction to identify the second beam having the second beam direction. In some examples, the beam direction adjustment may be expressed in a UE local coordinate system or a global coordinate system (e.g., expressed as angles in a 3D system).

At 524, the network entity 506 may provide an indication of the second beam having the second beam direction to the UE 502. For example, the indication of the second beam may include a spatial filter and/or phase shift to be applied to the antenna array of the UE, a beam direction adjustment (e.g., a change (delta) to be applied to the current spatial filter and/or phase shift), or other suitable beam identifier. The indication of the second beam may further include an indication of whether to apply the second beam direction to the Tx beam, the Rx beam, or both. For example, the indication may include an additional one or two bits to indicate the Tx and/or Rx beam. In some examples, the NTN entity 504 may identify the second beam based on the beam measurements of the received uplink reference signals. In this example, the NTN entity 504 may provide the indication of the second beam to the UE 502.

In some examples, the indication of the second beam may include a time window during which the UE 502 switches from the first beam direction to the second beam direction to provide for a temporary change in beam direction. In other examples, the indication of the second beam may further include a timer duration of a timer to be initialized by the UE 502 upon switching to the second beam direction. Upon expiration of the timer or at the end of the time window, the UE 502 may restore the first beam having the first beam direction. In some examples, the timer duration may include a first timer duration of a first timer indicating a time at which the beam switch from the first beam direction to the second beam direction should occur (e.g., upon expiration of the first timer, the UE 502 switches from the first beam direction to the second beam direction) and a second timer duration of a second timer indicating a time that the beam switch to the second beam direction is valid (e.g., upon expiration of the second timer, the UE 502 switches back to the first beam direction). At 526, the UE 502 communicates with the NTN entity 504 using the second beam (e.g., uses different spatial filters and/or phase shifts to adjust the Tx and/or Rx beam pointing direction to the second beam).

Figure 6:
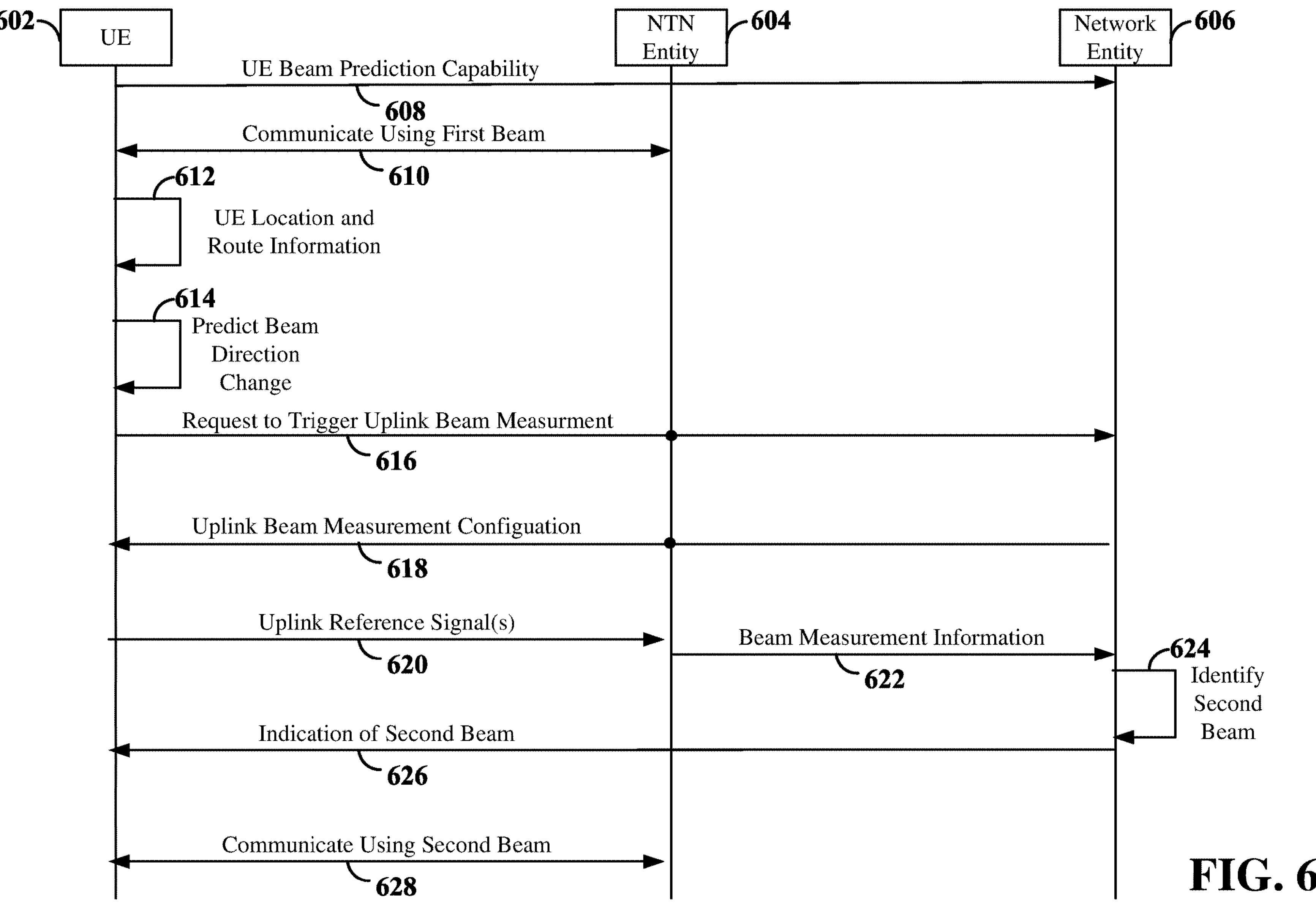
FIG. 6 is a diagram illustrating other exemplary signaling for beam management in NTN communication according to some aspects.

FIG. 6 is a diagram illustrating other exemplary signaling between a UE 602, a NTN entity 604, and a network entity 606 for beam management in NTN communication according to some aspects. The NTN entity 604 may correspond, for example, to any of the NTN entities illustrated in FIGS. 1, 2 and/or 4. In some examples, the network entity 606 may be a gNB (NG-RAN) within the NTN entity 604. In other examples, the network entity 606 may be a core network (5GC) entity (e.g., AMF, LMF, etc.) or an application layer network entity (e.g., an ADAS application server, V2X server, etc.). The UE 602 may correspond, for example, to any of the UEs illustrated in FIGS. 1, 2, and/or 4. For example, the UE 602 may be an OBU of a vehicle.

At 608, the UE 602 may transmit a capability of the UE 602 to determine a predicted beam direction change to the network entity 606. For example, the UE 602 may transmit the UE capability indicating the UE is capable of predicting a beam direction change based on the dynamics of the UE 602 and/or available external information, such as access to a digital/HD map. At 610, the UE 602 and NTN entity 604 may communicate via a satellite link using a first beam (e.g., Tx and/or Rx beam) at the UE. The first beam may have a first beam direction selected based on a spatial filter coefficient and/or phase applied by a phase shifter associated with an antenna array of the UE 602.

At 612, the UE 602 may determine the current location of the UE 602 and route information indicating a route of the UE 602. For example, the current location of the UE 602 and the route information may be available in an ADAS/AD system on the UE 602. In other examples, the UE 602 may include a global positioning system (GPS) system and navigation system therein to determine the UE's current location and route information. In still other examples, the UE 602 may determine the current location of the UE 602 using any available positioning mechanism (e.g., Uu/cellular and/or D2D positioning) and may further determine the route information based on a speed and orientation of the UE 602 (e.g., using a speedometer, camera, compass, or other suitable navigation tool).

At 614, the UE 602 may predict a beam direction change of the UE 602 based on a predicted change in a relative position of the UE 602 with respect to the NTN entity 604. The beam direction change may be predicted in accordance with one or more mobility parameters indicating the predicted change in the relative position of the UE 602 with respect to the NTN entity 604. In some examples, the mobility parameter(s) may include the current location of the UE 502, the route information, and/or the road infrastructure information. In some examples, the mobility parameter(s) may further include the first beam direction of the UE 602, a location or elevation of the NTN entity 604, an antenna array size of the UE 602, and/or a half-power beam width of the UE 602. In some examples, the mobility parameters may include an ephemeris and speed of the NTN entity 604. In this example, the current location of the UE 602, the route information, and/or the road infrastructure information, along with other mobility parameters, may be applied on top of the ephemeris and speed of the NTN entity 604 to identify the predicted beam direction change.

At 616, the UE 602 may send a request to the network entity 606 (e.g., via the NTN entity 604) to trigger an uplink beam measurement. In some examples, the UE 602 may request SRS resources and may further determine a number of SRS resources (beam directions) needed and request that number of SRS resources from the network entity 606. At 618, the network entity 506 may provide an uplink beam measurement configuration (e.g., radio resource control (RRC) configuration) to the UE 602 via the NTN entity 604. The uplink beam measurement configuration may include, for example, a configuration of one or more uplink reference signals to be transmitted by the UE 602. For example, the uplink beam measurement configuration may include one or more SRS resources or a range of potential beam direction change for the UE 602 to determine the spatial filters for SRS transmissions. In some examples, the network entity 606 may request the NTN entity 604 to generate and provide the uplink beam measurement configuration to the UE 602.

At 620, the UE 602 may transmit the one or more uplink reference signals (e.g., one or more SRSs) based on the configuration (e.g., in accordance with the SRS resources or range). The NTN entity 604 may perform beam measurements (e.g., reference signal received power (RSRP) or signal-to-interference-plus-noise ratio (SINR) measurements) on the received uplink reference signals, and at 622, provide beam measurement information to the network entity 606. In some examples, the beam measurement information may indicate the measured RSRP or SINR of each of the received SRSs.

At 624, the network entity 606 may identify a second beam (e.g., a Tx and/or Rx) beam for the UE 602 to communicate with the NTN entity 604. The second beam has a second beam direction in accordance with the predicted beam change. In some examples, the second beam may be identified based on the beam measurement information obtained from the uplink beam measurement of received SRSs. In other examples, the second beam may be directly identified based on the one or more mobility parameters. For example, the network entity 606 may determine a beam direction adjustment to the first beam direction to identify the second beam having the second beam direction. In some examples, the beam direction adjustment may be expressed in a UE local coordinate system or a global coordinate system (e.g., expressed as angles in a 3D system).

At 626, the network entity 606 may provide an indication of the second beam having the second beam direction to the UE 602. For example, the indication of the second beam may include a spatial filter and/or phase shift to be applied to the antenna array of the UE, a beam direction adjustment (e.g., a change (delta) to be applied to the current spatial filter and/or phase shift), or other suitable beam identifier. The indication of the second beam may further include an indication of whether to apply the second beam direction to the Tx beam, the Rx beam, or both. For example, the indication may include an additional one or two bits to indicate the Tx and/or Rx beam. In some examples, the NTN entity 604 may identify the second beam based on the beam measurements of the received uplink reference signals. In this example, the NTN entity 604 may provide the indication of the second beam to the UE 602.

In some examples, the indication of the second beam may include a time window during which the UE 602 switches from the first beam direction to the second beam direction to provide for a temporary change in beam direction. In other examples, the indication of the second beam may further include a timer duration of a timer to be initialized by the UE 602 upon switching to the second beam direction. Upon expiration of the timer or at the end of the time window, the UE 602 may restore the first beam having the first beam direction. In some examples, the timer duration may include a first timer duration of a first timer indicating a time at which the beam switch from the first beam direction to the second beam direction should occur (e.g., upon expiration of the first timer, the UE 602 switches from the first beam direction to the second beam direction) and a second timer duration of a second timer indicating a time that the beam switch to the second beam direction is valid (e.g., upon expiration of the second timer, the UE 602 switches back to the first beam direction). At 628, the UE 602 communicates with the NTN entity 604 using the second beam (e.g., uses different spatial filters and/or phase shifts to adjust the Tx and/or Rx beam pointing direction to the second beam).

Figure 7:
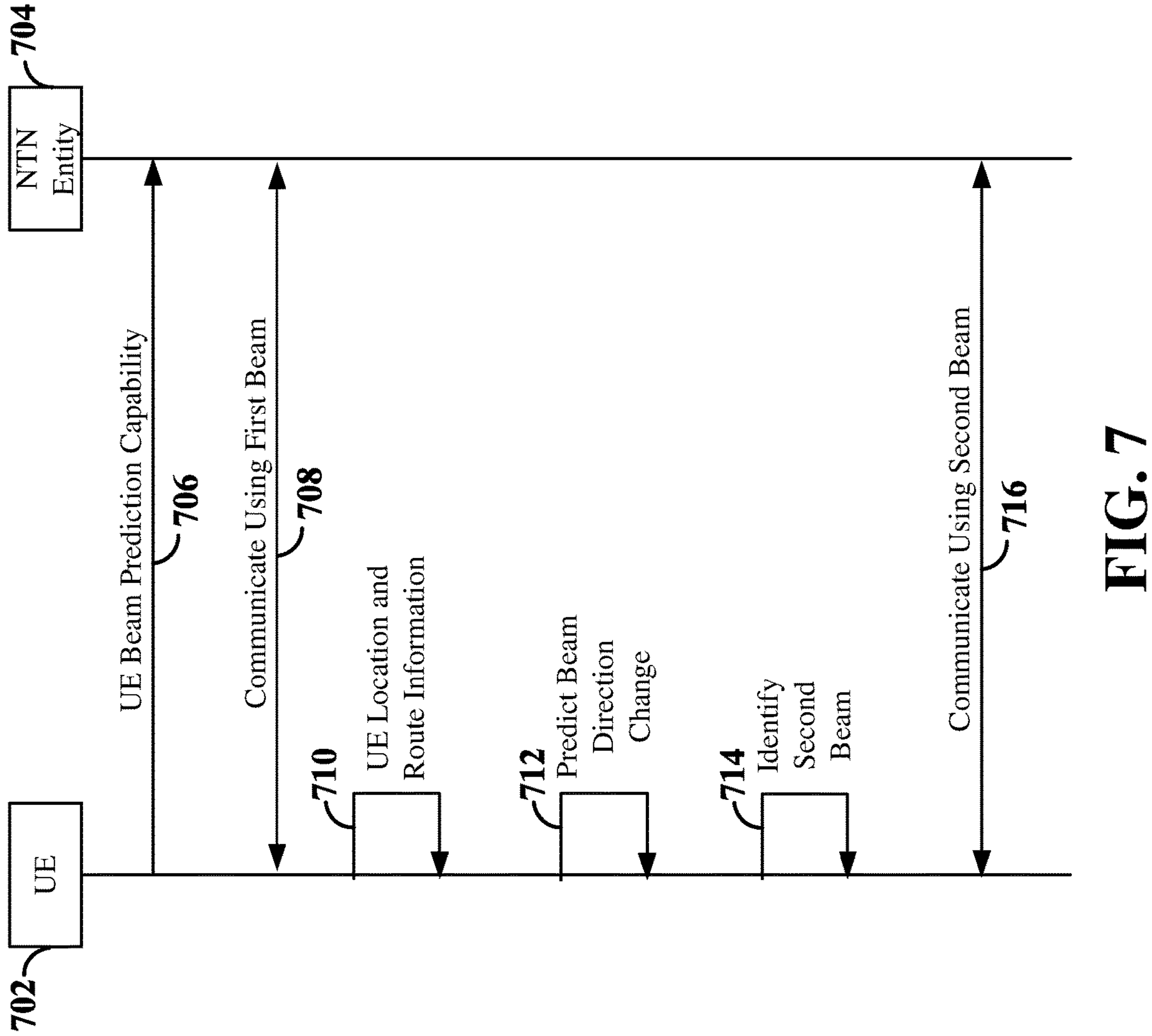
FIG. 7 is a diagram illustrating other exemplary signaling for beam management in NTN communication according to some aspects.

FIG. 7 is a diagram illustrating other exemplary signaling between a UE 702, a NTN entity 704, and a network entity 706 for beam management in NTN communication according to some aspects. The NTN entity 704 may correspond, for example, to any of the NTN entities illustrated in FIGS. 1, 2 and/or 4. The UE 702 may correspond, for example, to any of the UEs illustrated in FIGS. 1, 2, and/or 4. For example, the UE 702 may be an OBU of a vehicle.

At 706, the UE 702 may transmit a capability of the UE to determine the predicted beam change to the NTN entity 704 (or to a network entity (not shown) associated with the NTN entity 704). For example, the UE 602 may transmit the UE capability indicating the UE is capable of predicting a beam direction change based on the dynamics of the UE 602 and/or available external information, such as access to a digital/HD map. At 708, the UE 702 and NTN entity 704 may communicate via a satellite link using a first beam (e.g., Tx and/or Rx beam) at the UE. The first beam may have a first beam direction selected based on a spatial filter coefficient and/or phase applied by a phase shifter associated with an antenna array of the UE 702.

At 710, the UE 702 may determine the current location of the UE 702 and route information indicating a route of the UE 702. For example, the current location of the UE 702 and the route information may be available in an ADAS/AD system on the UE 702. In other examples, the UE 702 may include a global positioning system (GPS) system and navigation system therein to determine the UE's current location and route information. In still other examples, the UE 702 may determine the current location of the UE 702 using any available positioning mechanism (e.g., Uu/cellular and/or D2D positioning) and may further determine the route information based on a speed and orientation of the UE 702 (e.g., using a speedometer, camera, compass, or other suitable navigation tool).

At 712, the UE 702 may predict a beam direction change of the UE 702 based on a predicted change in a relative position of the UE 702 with respect to the NTN entity 704. The beam direction change may be predicted in accordance with one or more mobility parameters indicating the predicted change in the relative position of the UE 702 with respect to the NTN entity 704. In some examples, the mobility parameter(s) may include the current location of the UE 502, the route information, and/or the road infrastructure information. In some examples, the mobility parameter(s) may further include the first beam direction of the UE 702, a location or elevation of the NTN entity 704, an antenna array size of the UE 702, and/or a half-power beam width of the UE 702. In some examples, the mobility parameters may include an ephemeris and speed of the NTN entity 704. In this example, the current location of the UE 702, the route information, and/or the road infrastructure information, along with other mobility parameters, may be applied on top of the ephemeris and speed of the NTN entity 704 to identify the predicted beam direction change.

At 714, the UE 702 may identify a second beam (e.g., a Tx and/or Rx) beam for the UE 702 to communicate with the NTN entity 704. The second beam has a second beam direction in accordance with the predicted beam change. In some examples, the second beam may be identified based on the one or more mobility parameters. For example, the UE 702 may determine a beam direction adjustment to the first beam direction to identify the second beam having the second beam direction. In some examples, the beam direction adjustment may be expressed in a UE local coordinate system or a global coordinate system (e.g., expressed as angles in a 3D system).

In some examples, the UE 702 may further identify a time window during which the UE 702 switches from the first beam direction to the second beam direction to provide for a temporary change in beam direction. In other examples, the UE 702 may initialize a timer with a timer duration upon switching to the second beam direction. Upon expiration of the timer or at the end of the time window, the UE 702 may restore the first beam having the first beam direction. In some examples, the timer duration may include a first timer duration of a first timer indicating a time at which the beam switch from the first beam direction to the second beam direction should occur (e.g., upon expiration of the first timer, the UE 702 switches from the first beam direction to the second beam direction) and a second timer duration of a second timer indicating a time that the beam switch to the second beam direction is valid (e.g., upon expiration of the second timer, the UE 702 switches back to the first beam direction). At 716, the UE 702 communicates with the NTN entity 704 using the second beam (e.g., uses different spatial filters and/or phase shifts to adjust the Tx and/or Rx beam pointing direction to the second beam).

Figure 8:
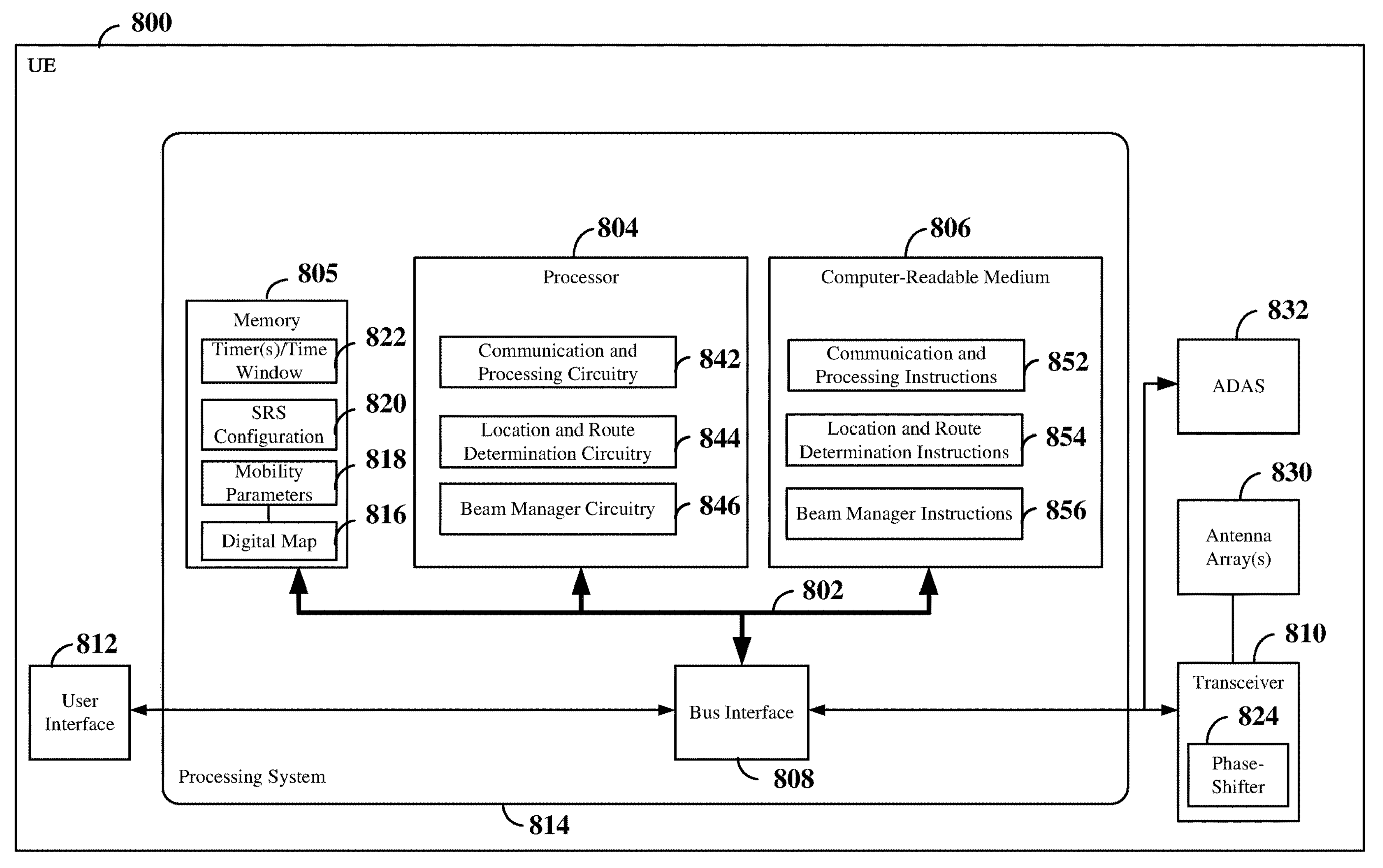
FIG. 8 is a block diagram illustrating an example of a hardware implementation for a user equipment (UE) employing a processing system according to some aspects.

FIG. 8 is a block diagram illustrating an example of a hardware implementation of a user equipment (UE) 800 employing a processing system 814 according to some aspects. The UE 800 may be any of the UEs or other scheduled entities illustrated in any one or more of FIGS. 1, 2, and/or 4-7. In some examples, the UE 800 may be an OBU of a vehicle.

In accordance with various aspects of the disclosure, an element, or any portion of an element, or any combination of elements may be implemented with a processing system 814 that includes one or more processors, such as processor 804. Examples of processors 804 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 800 may be configured to perform any one or more of the functions described herein. That is, the processor 804, as utilized in the UE 800, may be used to implement any one or more of the methods or processes described and illustrated, for example, in FIGS. 5-7 and/or 9.

The processor 804 may in some instances be implemented via a baseband or modem chip and in other implementations, the processor 804 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 814 may be implemented with a bus architecture, represented generally by the bus 802. The bus 802 may include any number of interconnecting buses and bridges depending on the specific application of the processing system 814 and the overall design constraints. The bus 802 communicatively couples together various circuits, including one or more processors (represented generally by the processor 804), a memory 805 (e.g., one or more memories), and computer-readable media (represented generally by the computer-readable medium 806). The bus 802 may also link various other circuits such as timing sources, peripherals, voltage regulators, and power management circuits, which are well known in the art, and therefore, are not described any further.

A bus interface 808 provides an interface between the bus 802 and a transceiver 810. The transceiver 810 may be, for example, a wireless transceiver. The transceiver 810 provides a means for communicating with various other apparatus over a transmission medium (e.g., air interface). The transceiver 810 may further be coupled to one or more antennas/antenna arrays (not shown). In some examples, the transceiver 810 may include multiple (e.g., one or more) transceivers. The bus interface 808 further provides an interface between the bus 802 and a user interface 812 (e.g., keypad, display, touch screen, speaker, microphone, control features, etc.). Of course, such a user interface 812 may be omitted in some examples.

The computer-readable medium 806 may be a non-transitory computer-readable medium and may include one or more computer-readable mediums. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 806 may reside in the processing system 814, external to the processing system 814, or distributed across multiple entities including the processing system 814. The computer-readable medium 806 may be embodied in a computer program product. By way of example, a computer program product may include a computer-readable medium in packaging materials. In some examples, the computer-readable medium 806 may be part of the memory 805. Those skilled in the art will recognize how best to implement the described functionality presented throughout this disclosure depending on the particular application and the overall design constraints imposed on the overall system. In some examples, the computer-readable medium 806 may be implemented on an article of manufacture, which may further include one or more other elements or circuits, such as the processor 804 and/or memory 805.

The computer-readable medium 806 may store computer-executable code (e.g., software). Software shall be construed broadly to mean instructions, instruction sets, code, code segments, program code, programs, subprograms, software modules, applications, software applications, software packages, routines, subroutines, objects, executables, threads of execution, procedures/processes, functions, etc., whether referred to as software, firmware, middleware, microcode, hardware description language, or otherwise.

One or more processors, such as processor 804, may be responsible for managing the bus 802 and general processing, including the execution of the software (e.g., instructions or computer-executable code) stored on the computer-readable medium 806. The software, when executed by the processor 804, causes the processing system 814 to perform the various processes and functions described herein for any particular apparatus. The computer-readable medium 806 and/or the memory 805 may also be used for storing data that may be manipulated by the processor 804 when executing software. For example, the memory 805 may store one or more of a digital map 816 (e.g., digital/HD map), mobility parameters 818, SRS configuration 820, and/or one or more timers and/or a time window 822.

In some aspects of the disclosure, the processor 804 may include circuitry configured for various functions. For example, the processor 804 may include communication and processing circuitry 842 configured to communicate with a network entity (e.g., a gNB or eNB) and/or a non-terrestrial network (NTN) entity. In some examples, the communication and processing circuitry 842 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 842 may include one or more transmit/receive chains. The communication and processing circuitry 842 may further be configured to execute communication and processing instructions (software) 852 stored on the computer-readable medium 806 to implement one or more functions described herein.

In some implementations where the communication involves receiving information, the communication and processing circuitry 842 may obtain information from a component of the UE 800 (e.g., from the transceiver 810 that receives the information via radio frequency signaling or some other type of signaling suitable for the applicable communication medium), process (e.g., decode) the information, and output the processed information. For example, the communication and processing circuitry 842 may output the information to another component of the processor 804, to the memory 805, or to the bus interface 808. In some examples, the communication and processing circuitry 842 may receive one or more of signals, messages, other information, or any combination thereof. In some examples, the communication and processing circuitry 842 may receive information via one or more channels. In some examples, the communication and processing circuitry 842 may include functionality for a means for receiving. In some examples, the communication and processing circuitry 842 may include functionality for a means for processing, including a means for demodulating, a means for decoding, etc.

In some implementations where the communication involves sending (e.g., transmitting) information, the communication and processing circuitry 842 may obtain information (e.g., from another component of the processor 804, the memory 805, or the bus interface 808), process (e.g., modulate, encode, etc.) the information, and output the processed information. For example, the communication and processing circuitry 842 may output the information to the transceiver 810 (e.g., that transmits the information via radio frequency signaling or some other type of signaling suitable for the applicable communication medium). In some examples, the communication and processing circuitry 842 may send one or more of signals, messages, other information, or any combination thereof. In some examples, the communication and processing circuitry 842 may send information via one or more channels. In some examples, the communication and processing circuitry 842 may include functionality for a means for sending (e.g., a means for transmitting). In some examples, the communication and processing circuitry 842 may include functionality for a means for generating, including a means for modulating, a means for encoding, etc.

In some examples, the communication and processing circuitry 842 may be configured to receive and process downlink beamformed signals at a mmWave frequency or a sub-6 GHz frequency via the transceiver 810 and the antenna array 830 (e.g., using a phase-shifter 824). In addition, the communication and processing circuitry 842 may be configured to generate and transmit uplink beamformed signals at a mmWave frequency or a sub-6 GHz frequency via the transceiver 810 and antenna array 830 (e.g., using the phase-shifter 824.

The communication and processing circuitry 842 may be configured to communicate with a NTN entity using a first beam at the UE 800 having a first beam direction. The communication and processing circuitry 842 may further be configured to communicate with the NTN entity using a second beam at the UE 800 having a second beam direction different than the first beam direction.

The communication and processing circuitry 842 may further be configured to transmit a capability of the UE 800 to determine a predicted beam change to a network entity associated with the NTN entity. In some examples, the network entity may be within the NTN entity or may be a separate network node, such as a core network entity (e.g., AMF or LMF) or an application layer network entity (e.g., an ADAS/AD server or V2X application server).

The communication and processing circuitry 842 may further be configured to send a request to the network entity associated with the NTN entity to trigger an uplink beam measurement. In addition, the communication and processing circuitry 842 may be configured to receive a configuration (e.g., SRS configuration 820) of one or more uplink reference signals for the uplink beam measurement and to transmit the one or more uplink reference signals (e.g., SRSs) based on the configuration.

The communication and processing circuitry 842 may further be configured to receive an indication of the second beam direction from the network entity in accordance with the uplink beam measurement or directly without consideration of the uplink beam measurement. The communication and processing circuitry 842 may further be configured to receive a time window and/or one or more timer durations 822 from the network entity. The communication and processing circuitry 842 may further be configured to execute communication and processing instructions (software) 852 stored on the computer-readable medium 806 to implement one or more functions described herein.

The processor 804 may further include location and route determination circuitry 844, configured to identify a current location and route information indicating a current route of the UE 800. For example, the location and route determination circuitry 844 may access an ADAS system 832 on the UE 802 to determine the current location of the UE 800 and the route of the UE 800. The current location and route information of the UE 800 may further be stored in the memory 805 as mobility parameters 818. In other examples, the location and route determination circuitry 844 may access a GPS system and/or navigation system (not shown) on the UE 800, execute other positioning algorithms (e.g., TDOA, RTT, angle of arrival, D2D location determination, etc.) and route determination algorithms (e.g., based on input from a speedometer, compass, etc.), or receive the location and/or route from the network. The location and route determination circuitry 844 may further be configured to execute location and route determination instructions (software) 854 stored on the computer-readable medium 806 to implement one or more functions described herein.

The processor 804 may further include beam manager circuitry 846, configured to switch from the first beam having the first beam direction to a second beam having a second beam direction different than the first beam direction in accordance with a predicted beam direction change based on a predicted change in a relative position of the UE 800 with respect to the NTN entity. The beam manager circuitry 846 may correspond, for example, to the beam manager circuitry shown in FIGS. 1, 2, and/or 4.

In some examples, the beam manager circuitry 846 may be configured to predict the predicted beam direction change in accordance with one or more mobility parameters 818 indicating the predicted change in the relative position of the UE 800 with respect to the NTN entity. In some examples, the beam manager circuitry 846 may further be configured to identify the second beam direction based on the one or more mobility parameters 818. In other examples, the beam manager circuitry 846 may be configured to receive the second beam direction (e.g., via the communication and processing circuitry 842) from the network entity.

In some examples, the beam manager circuitry 846 may be configured to access the digital map 816 indicating road infrastructure information. For example, the road infrastructure information may indicate one or more of a number of lanes, a road curvature, or a road slope related to the route of the UE. The road infrastructure information related to the route of the UE may further be stored as part of the mobility parameters 818. For example, the mobility parameters 818 used to predict the predicted beam direction change (and/or to identify the second beam direction) may include at least one of the current location, the route information, or the road infrastructure information. In some examples, the mobility parameters 818 may further include at least one of the first beam direction, a location or elevation of the NTN entity, an antenna array size of the UE, or a half-power beam width of the UE.

In some examples, the one or more mobility parameters 818 used to predict the predicted beam direction change (and/or to identify the second beam direction) may include an ephemeris and speed of the NTN entity (e.g., which may be provided by the NTN entity to the UE 800). In this example, the one or more mobility parameters 818 used to predict the predicted beam direction change (and/or to identify the second beam direction) may further include at least one of the current location, the route information, or the road infrastructure information. In addition, the one or more mobility parameters may further include at least one of the first beam direction, a location or elevation of the NTN entity, an antenna array size of the UE, or a half-power beam width of the UE.

In some examples, the beam manager circuitry 846 may further be configured to access the SRS configuration 820 (e.g., received via the communication and processing circuitry 842 and stored within the memory 805) and to initiate transmission of the one or more uplink reference signals (e.g., SRSs) based on the SRS configuration 820.

In addition, the beam manager circuitry 846 may be configured to switch from the first beam having the first beam direction to the second beam having the second beam direction. In some examples, the beam manager circuitry 846 may be configured to switch from the first beam having the first beam direction to the second beam having the second beam direction during a time window and restore the first beam having the first beam direction at an end of the time window. In other examples, the beam manager circuitry 846 may be configured to switch from the first beam having the first beam direction to the second beam having the second beam direction upon expiration of a first timer and to restore the first beam having the first beam direction upon expiration of a second timer. In some examples, the beam manager circuitry 846 may be configured to switch from the first beam having the first beam direction to the second beam having the second beam direction and maintain the second beam having the second beam direction until another beam direction change is triggered or received. The beam manager circuitry 846 may further be configured to execute beam manager instructions (software) 856 stored on the computer-readable medium 806 to implement one or more functions described herein.

Figure 9:
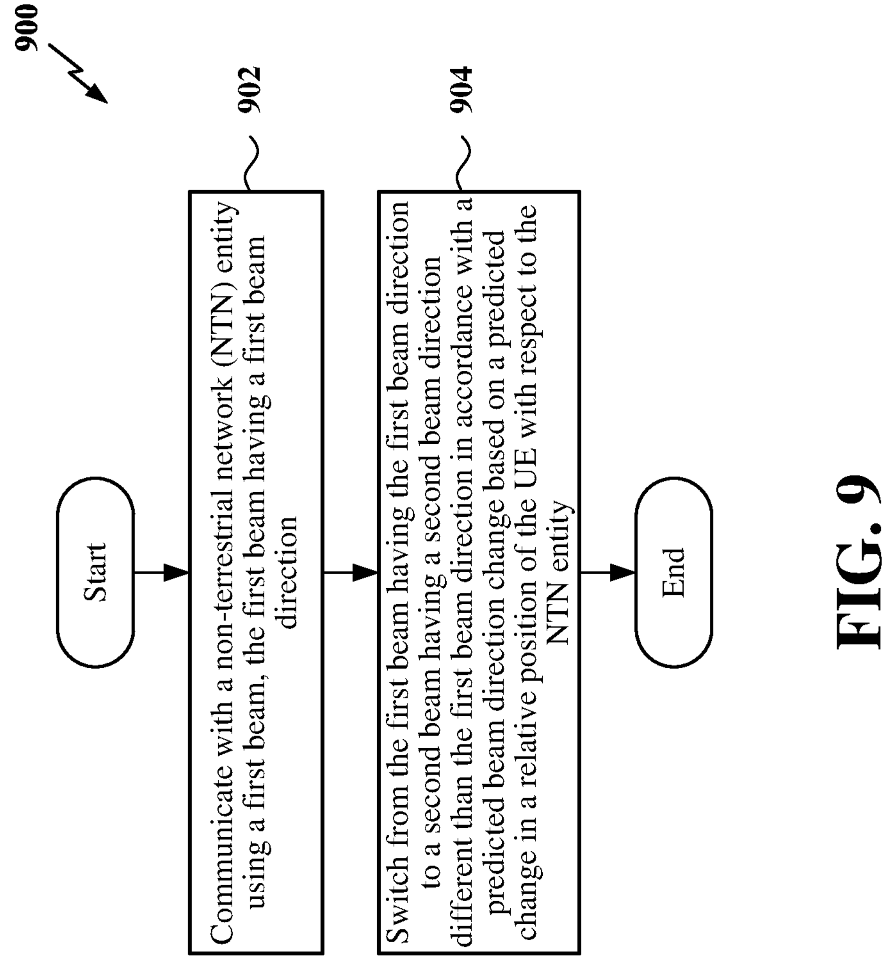
FIG. 9 is a flow chart illustrating an exemplary method for beam management in NTN communication according to some aspects.

FIG. 9 is a flow chart illustrating an exemplary method 900 for beam management in NTN communication according to some aspects. As described below, some or all illustrated features may be omitted in a particular implementation within the scope of the present disclosure, and some illustrated features may not be required for implementation of all embodiments. In some examples, the method 900 may be carried out by the UE 800 illustrated in FIG. 8. In some examples, the method 900 may be carried out by any suitable apparatus or means for carrying out the functions or algorithm described below.

At block 902, the UE may communicate with a non-terrestrial network (NTN) entity using a first beam, the first beam having a first beam direction. For example, the communication and processing circuitry 842, together with the transceiver 810 and antenna array(s) 830 shown and described above in connection with FIG. 8, may provide a means to communicate with the NTN using the first beam.

At block 904, the UE may switch from the first beam having the first beam direction to a second beam having a second beam direction different than the first beam direction in accordance with a predicted beam direction change based on a predicted change in a relative position of the UE with respect to the NTN entity. For example, the beam manager circuitry 946 shown and described in connection with FIG. 8 may provide a means to switch from the first beam direction to the second beam direction.

In some examples, the UE may further predict the predicted beam direction change in accordance with one or more mobility parameters indicating the predicted change in the relative position of the UE with respect to the NTN entity. In some examples, the UE may transmit a capability of the UE to determine the predicted beam change to a network entity associated with the NTN entity. In some examples, the UE may identify the second beam direction based on the one or more mobility parameters. In some examples, the UE may send a request to a network entity associated with the NTN entity to trigger an uplink beam measurement. The UE may further receive a configuration of one or more uplink reference signals for the uplink beam measurement. The UE may further receive an indication of the second beam direction from the network entity in accordance with the uplink beam measurement.

In some examples, the UE may access a digital map indicating road infrastructure information and identify a current location of the UE and route information indicating a route of the UE. In some examples, the road infrastructure information indicates one or more of a number of lanes, a road curvature, or a road slope related to the route of the UE. In some examples, the one or more mobility parameters include at least one of the current location, the route information, or the road infrastructure information. In some examples, the one or more mobility parameters may further include at least one of the first beam direction, a location or elevation of the NTN entity, an antenna array size of the UE, or a half-power beam width of the UE.

In some examples, the one or more mobility parameters include an ephemeris and speed of the NTN entity. In this example, the one or more mobility parameters may further include at least one of the current location, the route information, or the road infrastructure information.

In some examples, the UE may receive an indication of the second beam direction from a network entity associated with the NTN entity. In this example, the UE may further receive a configuration of one or more uplink reference signals for an uplink beam measurement, transmit the one or more uplink reference signals based on the configuration and receive the indication of the second beam direction from the network entity in accordance with the uplink beam measurement.

In some examples, the UE may switch from the first beam having the first beam direction to the second beam having the second beam direction during a time window and restore the first beam having the first beam direction at an end of the time window. In some examples, the UE may switch from the first beam having the first beam direction to the second beam having the second beam direction upon expiration of a first timer and restore the first beam having the first beam direction upon expiration of a second timer.

In one configuration, the UE includes means for communicating with a non-terrestrial network (NTN) entity using a first beam at the UE, the first beam comprising a first beam direction, and means for switching from the first beam comprising the first beam direction to a second beam comprising a second beam direction different than the first beam direction in accordance with a predicted beam direction change based on a predicted change in a relative position of the UE with respect to the NTN entity. In one aspect, the aforementioned means may be the processor 804 shown in FIG. 8 configured to perform the functions recited by the aforementioned means. In another aspect, the aforementioned means may be a circuit or any apparatus configured to perform the functions recited by the aforementioned means.

Of course, in the above examples, the circuitry included in the processor 804 is merely provided as an example, and other means for carrying out the described functions may be included within various aspects of the present disclosure, including but not limited to the instructions stored in the computer-readable storage medium 806, or any other suitable apparatus or means described in any one of the FIGS. 1, 2, and/or 4-8, and utilizing, for example, the processes and/or algorithms described herein in relation to FIGS. 5-7 and/or 9.

Figure 10:
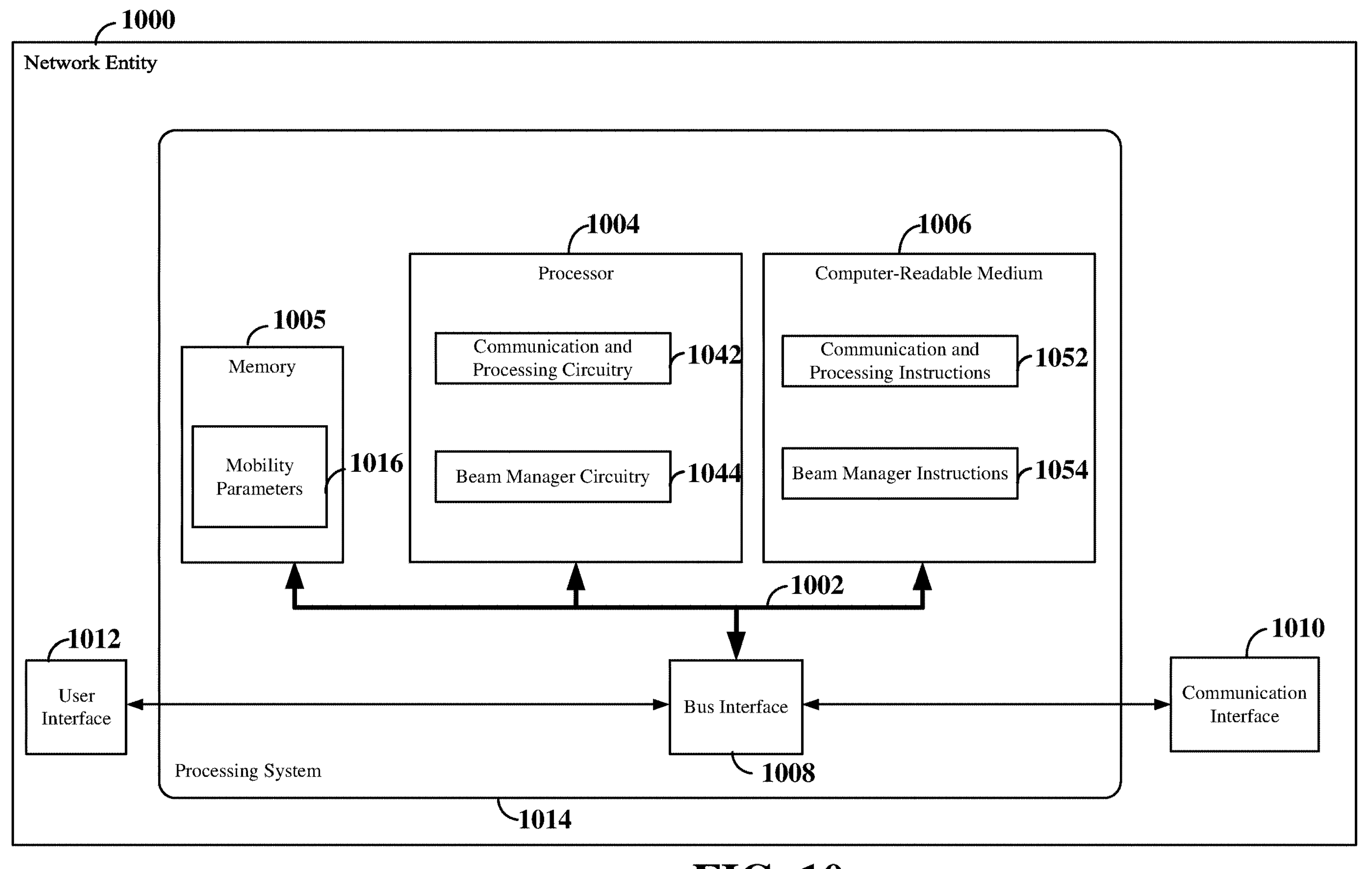
FIG. 10 is a block diagram illustrating an example of a hardware implementation for a network entity employing a processing system according to some aspects.

FIG. 10 is a block diagram illustrating an example of a hardware implementation of a network entity 1000 employing a processing system 1014 according to some aspects. The network entity 1000 may be, for example, a network entity or other network node illustrated in any one or more of FIGS. 1, 2, and/or 4-7. For example, the network entity may be a gNB within an NTN entity, a core network entity (e.g., AMF or LMF) or an application layer network entity (e.g., an ADAS application server or V2X application server). The network entity 1000 (e.g., within the NTN entity) may further be implemented in an aggregated or monolithic base station architecture, or in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. In addition, the network entity 1000 may be a stationary network entity or a mobile network entity.

In accordance with various aspects of the disclosure, an element, or any portion of an element, or any combination of elements may be implemented with a processing system 1014 that includes one or more processors, such as processor 1004. The processing system 1014 may be substantially the same as the processing system 814 as shown and described above in connection with FIG. 8, including a bus interface 1008, a bus 1002, a memory 1005 (e.g., one or more memories), a processor 1004 (e.g., one or more processors), and a computer-readable medium 1006 (e.g., one or more computer-readable mediums). Accordingly, their descriptions will not be repeated for the sake of brevity. Furthermore, the network entity 1000 may include an optional user interface 1012 and a communication interface 1010 (e.g., wired or wireless), such as one or more transceivers or one or more network interfaces.

The processor 1004, as utilized in the network entity 1000, may be used to implement any one or more of the processes described below. In some examples, the memory 1005 may store mobility parameters 1016.

In some aspects of the disclosure, the processor 1004 may include communication and processing circuitry 1042 configured for various functions, including, for example, communicating with one or more UEs, a core network node, or other network entity. In some examples (e.g., in an aggregated base station architecture), the communication and processing circuitry 1042 may include one or more hardware components that provide the physical structure that performs processes related to wireless communication (e.g., signal reception and/or signal transmission) and/or signal processing (e.g., processing a received signal and/or processing a signal for transmission). In addition, the communication and processing circuitry 1042 may be configured to process and transmit downlink traffic and downlink control and receive and process uplink traffic and uplink control.

In some examples, the communication and processing circuitry 1042 may be configured to provide an indication of a second beam for a UE to communicate with a non-terrestrial network (NTN) entity associated with the network entity 1000. The second beam has a second beam direction in accordance with the predicted beam direction change. In addition, the second beam is different than a first beam used by the UE to communicate with the NTN entity.

The communication and processing circuitry 1042 may further be configured to enable a configuration of one or more uplink reference signals for an uplink beam measurement to be provided to the UE. For example, the communication and processing circuitry 1042 may provide the configuration (e.g., SRS configuration) to the UE or may instruct the NTN entity to provide the configuration to the UE. The communication and processing circuitry 1042 may further be configured to receive beam measurement information associated with the one or more uplink signals sent in accordance with the configuration. In some examples, the beam measurement information may be received from the NTN entity that received the one or more uplink reference signals. In other examples, the beam measurement information may be generated by the NTN entity and processed by the beam manager circuitry 1044 within the NTN entity. In addition, the communication and processing circuitry 1042 may be configured to provide the indication of the second beam in accordance with the uplink beam measurement. The communication and processing circuitry 1042 may further be configured to execute communication and processing software 1052 stored on the computer-readable medium 1006 to implement one or more functions described herein.

The processor 1004 may further include beam manager circuitry 1044, configured to identify a first beam at a UE for communication with the NTN entity associated with the network entity and predict a predicted beam direction change in accordance with one or more mobility parameters 1016 indicating a predicted change in a relative position of the UE with respect to the NTN entity. The beam manager circuitry 1044 may correspond, for example, to the beam manager circuitry shown in FIGS. 1, 2, and/or 4.

The beam manager circuitry 1044 may further be configured to identify the second beam based on the one or more mobility parameters 1016. For example, the beam manager circuitry 1044 may be configured to access road infrastructure information and identify a current location of the UE and route information indicating a route of the UE. For example, the road infrastructure information may include one or more of a number of lanes, a road curvature, or a road slope. In some examples, the beam manager circuitry 1044 may receive at least one of the road infrastructure information, the current location of the UE, or the route information via the communication and processing circuitry 1042.

In some examples, the one or more mobility parameters 1016 may include at least one of the current location, the route information, or the road infrastructure information. In some examples, the one or more mobility parameters 1016 may further include at least one of the first beam direction, a location or elevation of the NTN entity, an antenna array size of the UE, or a half-power beam width of the UE.

In some examples, the one or more mobility parameters 1016 may include an ephemeris and speed of the NTN entity. In this example, the one or more mobility parameters 1016 may further include at least one of the current location, the route information, or the road infrastructure information.

In some examples, the beam manager circuitry 1044 may be configured to implement the uplink beam measurement and/or to provide the second beam direction via the communication and processing circuitry 1042. In some examples, the second beam direction includes a beam direction adjustment expressed in a UE local coordinate system or a global coordinate system. In some examples, the beam manager circuitry 1044 is further configured to provide a time window during which the UE switches from the first beam direction to the second beam direction via the communication and processing circuitry 1042. The beam manager circuitry 1044 may further be configured to execute beam manager instructions (software) 1054 stored on the computer-readable medium 1006 to implement one or more functions described herein.

Figure 11:
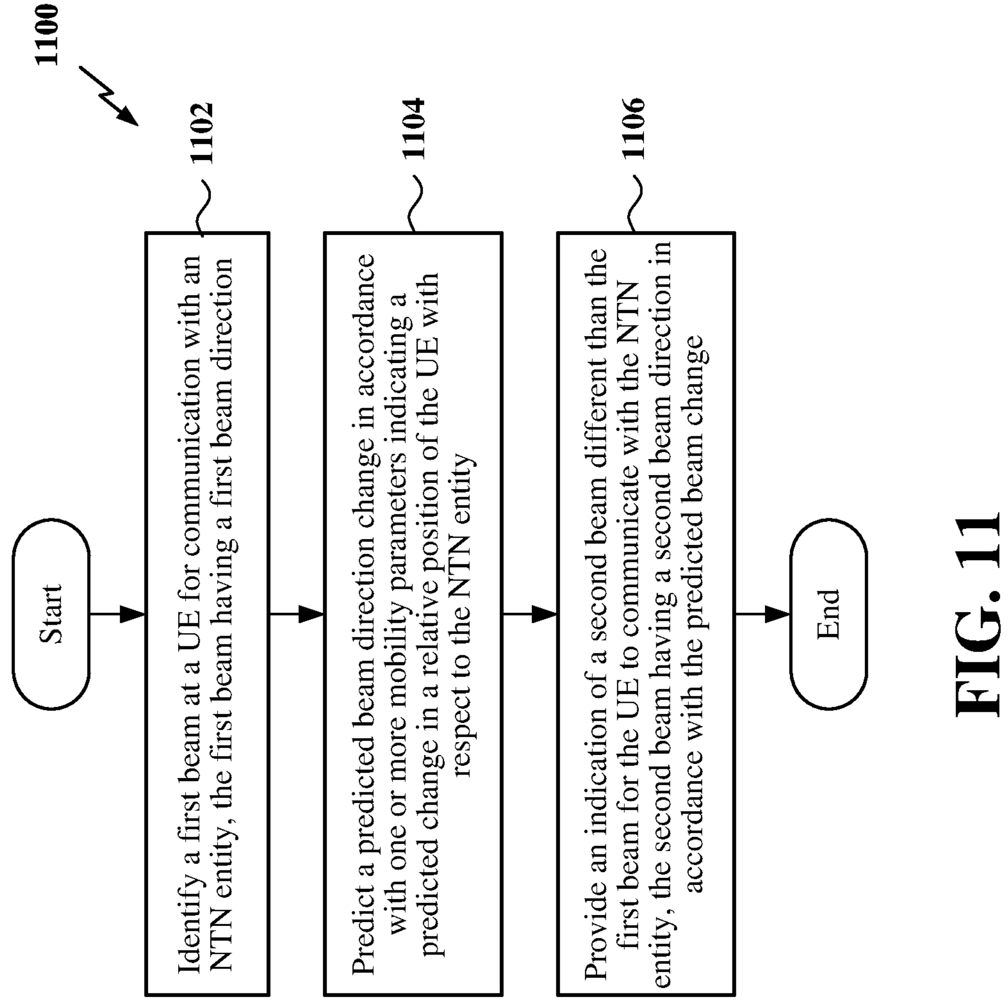
FIG. 11 is a flow chart illustrating another exemplary method for beam management in NTN communication according to some aspects.

FIG. 11 is a flow chart illustrating an exemplary method 1100 for beam management in NTN communication according to some aspects. As described below, some or all illustrated features may be omitted in a particular implementation within the scope of the present disclosure, and some illustrated features may not be required for implementation of all embodiments. In some examples, the method 1100 may be carried out by the network entity 1000 illustrated in FIG. 10. In some examples, the method 1100 may be carried out by any suitable apparatus or means for carrying out the functions or algorithm described below. In some examples, the network entity may be an NTN entity, a core network entity, or an application layer network entity.

At block 1102, the network entity may identify a first beam at a UE for communication with a non-terrestrial network (NTN) entity, the first beam having a first beam direction. For example, the beam manager circuitry 1044 shown and described above in connection with FIG. 10 may provide a means to identify the first beam.

At block 1104, the network entity may predict a predicted beam direction change in accordance with one or more mobility parameters indicating a predicted change in a relative position of the UE with respect to the NTN entity. For example, the beam manager circuitry 1044 shown and described above in connection with FIG. 10 may provide a means to predict the predicted beam change.

In some examples, the network entity may access road infrastructure information and identify a current location of the UE and route information indicating a route of the UE. For example, the road infrastructure information may indicate one or more of a number of lanes, a road curvature, or a road slope. In some examples, the one or more mobility parameters may include at least one of the current location, the route information, or the road infrastructure information. In some examples, the one or more mobility parameters may further include at least one of the first beam direction, a location or elevation of the NTN entity, an antenna array size of the UE, or a half-power beam width of the UE. In some examples, the one or more mobility parameters may include an ephemeris and speed of the NTN entity. In this example, the one or more mobility parameters may further include at least one of the current location, the route information, or the road infrastructure information. In some examples, the network entity may receive at least one of the road infrastructure information, the current location of the UE, or the route information.

At block 1106, the network entity may provide an indication of a second beam different than the first beam for the UE to communicate with the NTN entity. The second beam has a second beam direction in accordance with the predicted beam direction change. For example, the beam manager circuitry 1044, together with the communication and processing circuitry 1042 and communication interface 1010, may provide a means to provide an indication of the second beam.

In some examples, the network entity may further enable a configuration of one or more uplink reference signals for an uplink beam measurement to be provided to the UE. The network entity may further be configured to receive beam measurement information associated with the one or more uplink reference signals sent in accordance with the configuration. The network entity may further provide the indication of the second beam direction in accordance with the uplink beam measurement. In some examples, the network entity may identify the second beam direction based on the one or more mobility parameters.

In one configuration, the network entity includes means for identifying a first beam at a user equipment (UE) for communication with a non-terrestrial network (NTN) entity associated with the network entity, the first beam comprising a first beam direction, means for predicting a predicted beam direction change in accordance with one or more mobility parameters indicating a predicted change in a relative position of the UE with respect to the NTN entity, and means for providing an indication of a second beam different than the first beam for the UE to communicate with the NTN entity, the second beam comprising a second beam direction in accordance with the predicted beam direction change. In one aspect, the aforementioned means may be the processor 1004 shown in FIG. 10 configured to perform the functions recited by the aforementioned means. In another aspect, the aforementioned means may be a circuit or any apparatus configured to perform the functions recited by the aforementioned means.

Of course, in the above examples, the circuitry included in the processor 1004 is merely provided as an example, and other means for carrying out the described functions may be included within various aspects of the present disclosure, including but not limited to the instructions stored in the computer-readable storage medium 1006, or any other suitable apparatus or means described in any one of the FIGS. 1, 2, 4-7, and/or 10 and utilizing, for example, the processes and/or algorithms described herein in relation to FIGS. 5-7 and/or 11.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB (gNB), access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 12:
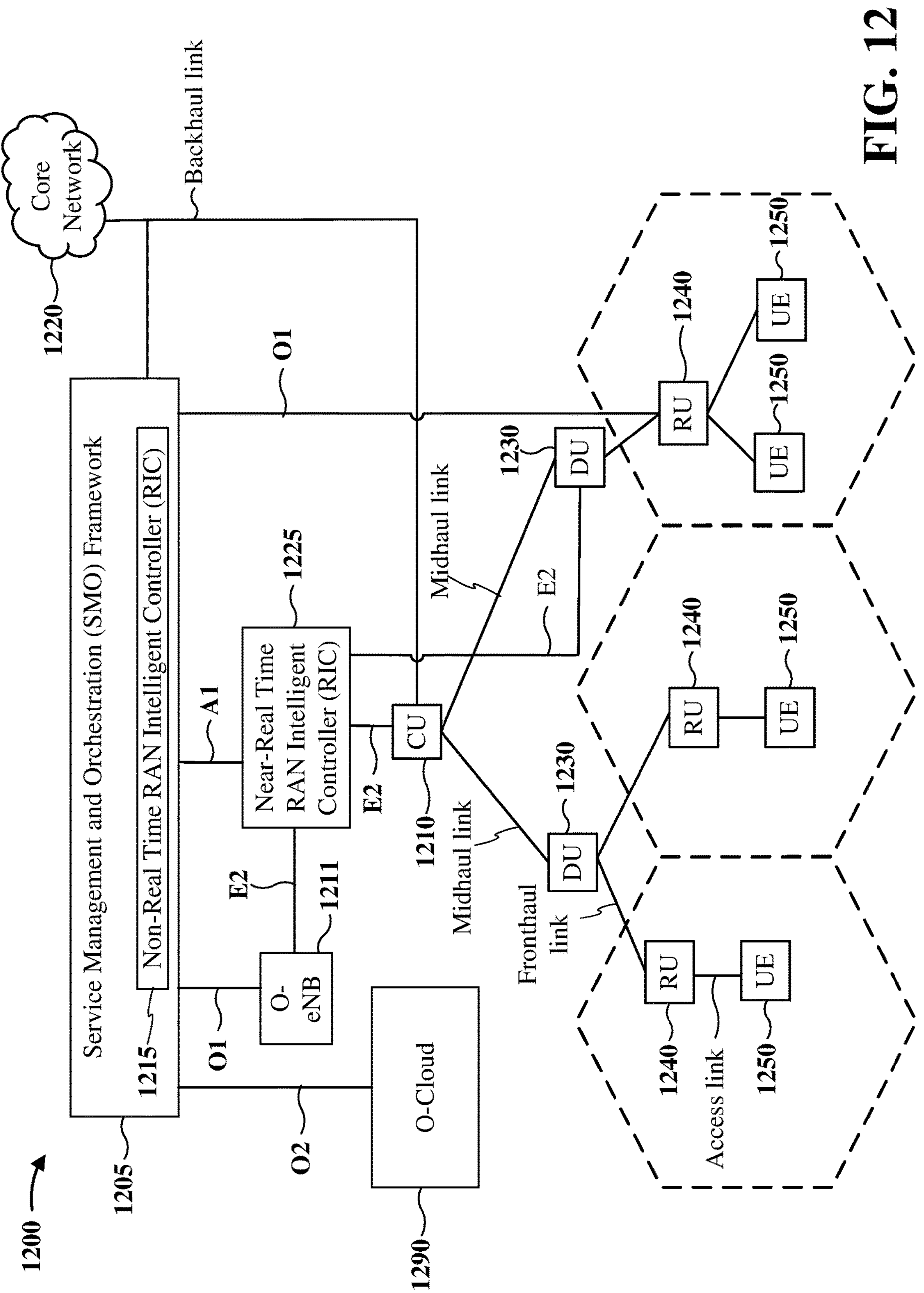
FIG. 12 is a diagram providing a high-level illustration of one example of a configuration of a disaggregated base station according to some aspects.

FIG. 12 shows a diagram illustrating an example disaggregated base station 1200 architecture. The disaggregated base station 1200 architecture may include one or more central units (CUs) 1210 that can communicate directly with a core network 1220 via a backhaul link, or indirectly with the core network 1220 through one or more disaggregated base station units (such as a Near-Real Time (Near-RT) RAN Intelligent Controller (RIC) 1225 via an E2 link, or a Non-Real Time (Non-RT) RIC 1215 associated with a Service Management and Orchestration (SMO) Framework 1205, or both). A CU 1210 may communicate with one or more distributed units (DUs) 1230 via respective midhaul links, such as an F1 interface. The DUs 1230 may communicate with one or more radio units (RUs) 1240 via respective fronthaul links. The RUs 1240 may communicate with respective UEs 1250 via one or more radio frequency (RF) access links. In some implementations, the UE 1250 may be simultaneously served by multiple RUs 1240.

Each of the units, i.e., the CUS 1210, the DUs 1230, the RUs 1240, as well as the Near-RT RICs 1225, the Non-RT RICs 1215 and the SMO Framework 1205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 1210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 1210. The CU 1210 may be configured to handle user plane functionality (i.e., Central Unit-User Plane (CU-UP)), control plane functionality (i.e., Central Unit-Control Plane (CU-CP)), or a combination thereof. In some implementations, the CU 1210 can be logically split into one or more CU-UP units and one or more CU-CP units. The CU-UP unit can communicate bidirectionally with the CU-CP unit via an interface, such as the E1 interface when implemented in an O-RAN configuration. The CU 1210 can be implemented to communicate with the DU 1230, as necessary, for network control and signaling.

The DU 1230 may correspond to a logical unit that includes one or more base station functions to control the operation of one or more RUs 1240. In some aspects, the DU 1230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 1230 may further host one or more low PHY layers. Each layer (or module) can be implemented with an interface configured to communicate signals with other layers (and modules) hosted by the DU 1230, or with the control functions hosted by the CU 1210.

Lower-layer functionality can be implemented by one or more RUs 1240. In some deployments, an RU 1240, controlled by a DU 1230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 1240 can be implemented to handle over the air (OTA) communication with one or more UEs 1250. In some implementations, real-time and non-real-time aspects of control and user plane communication with the RU(s) 1240 can be controlled by the corresponding DU 1230. In some scenarios, this configuration can enable the DU(s) 1230 and the CU 1210 to be implemented in a cloud-based RAN architecture, such as a vRAN architecture.

The SMO Framework 1205 may be configured to support RAN deployment and provisioning of non-virtualized and virtualized network elements. For non-virtualized network elements, the SMO Framework 1205 may be configured to support the deployment of dedicated physical resources for RAN coverage requirements which may be managed via an operations and maintenance interface (such as an O1 interface). For virtualized network elements, the SMO Framework 1205 may be configured to interact with a cloud computing platform (such as an open cloud (O-Cloud) 1290) to perform network element life cycle management (such as to instantiate virtualized network elements) via a cloud computing platform interface (such as an O2 interface). Such virtualized network elements can include, but are not limited to, CUs 1210, DUs 1230, RUs 1240 and Near-RT RICs 1225. In some implementations, the SMO Framework 1205 can communicate with a hardware aspect of a 5G RAN, such as an open eNB (O-eNB) 1211, via an O1 interface. Additionally, in some implementations, the SMO Framework 1205 can communicate directly with one or more RUs 1240 via an O1 interface. The SMO Framework 1205 also may include a Non-RT RIC 1215 configured to support functionality of the SMO Framework 1205.

The Non-RT RIC 1215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 1225. The Non-RT RIC 1215 may be coupled to or communicate with (such as via an A1 interface) the Near-RT RIC 1225. The Near-RT RIC 1225 may be configured to include a logical function that enables near-real-time control and optimization of RAN elements and resources via data collection and actions over an interface (such as via an E2 interface) connecting one or more CUs 1210, one or more DUs 1230, or both, as well as an O-eNB, with the Near-RT RIC 1225.

In some implementations, to generate AI/ML models to be deployed in the Near-RT RIC 1225, the Non-RT RIC 1215 may receive parameters or external enrichment information from external servers. Such information may be utilized by the Near-RT RIC 1225 and may be received at the SMO Framework 1205 or the Non-RT RIC 1215 from non-network data sources or from network functions. In some examples, the Non-RT RIC 1215 or the Near-RT RIC 1225 may be configured to tune RAN behavior or performance. For example, the Non-RT RIC 1215 may monitor long-term trends and patterns for performance and employ AI/ML models to perform corrective actions through the SMO Framework 1205 (such as reconfiguration via O1) or via creation of RAN management policies (such as A1 policies).

The following provides an overview of aspects of the present disclosure:

Aspect 1: A method operable at a user equipment (UE), the method comprising: communicating with a non-terrestrial network (NTN) entity using a first beam at the UE, the first beam comprising a first beam direction; and switching from the first beam comprising the first beam direction to a second beam comprising a second beam direction different than the first beam direction in accordance with a predicted beam direction change based on a predicted change in a relative position of the UE with respect to the NTN entity.

Aspect 2: The method of aspect 1, further comprising: predicting the predicted beam direction change in accordance with one or more mobility parameters indicating the predicted change in the relative position of the UE with respect to the NTN entity.

Aspect 3: The method of aspect 2, further comprising: transmitting a capability of the UE to determine the predicted beam direction change to a network entity associated with the NTN entity.

Aspect 4: The method of aspect 2 or 3, further comprising: sending a request to a network entity associated with the NTN entity to trigger an uplink beam measurement; receiving a configuration of one or more uplink reference signals for the uplink beam measurement; transmitting the one or more uplink reference signals based on the configuration; and receiving an indication of the second beam direction from the network entity in accordance with the uplink beam measurement.

Aspect 5: The method of aspect 2 or 3, further comprising: identifying the second beam direction based on the one or more mobility parameters.

Aspect 6: The method of any of aspects 2 through 5, further comprising: accessing a digital map indicating road infrastructure information; and identifying a current location of the UE and route information indicating a route of the UE.

Aspect 7: The method of aspect 6, wherein the road infrastructure information indicates one or more of a number of lanes, a road curvature, or a road slope related to the route of the UE.

Aspect 8: The method of aspect 6 or 7, wherein the one or more mobility parameters comprises at least one of the current location, the route information, or the road infrastructure information.

Aspect 9: The method of aspect 8, wherein the one or more mobility parameters further comprises at least one of the first beam direction, a location or elevation of the NTN entity, an antenna array size of the UE, or a half-power beam width of the UE.

Aspect 10: The method of aspect 6 or 7, wherein the one or more mobility factors comprises an ephemeris and speed of the NTN entity.

Aspect 11: The method of aspect 10, wherein the one or more mobility parameters further comprises at least one of the current location, the route information, or the road infrastructure information.

Aspect 12: The method of aspect 1, further comprising: receiving an indication of the second beam direction from a network entity associated with the NTN entity.

Aspect 13: The method of aspect 12, wherein the receiving the indication of the second beam direction further comprises: receiving a configuration of one or more uplink reference signals for an uplink beam measurement; transmitting the one or more uplink reference signals based on the configuration; and receiving the indication of the second beam direction from the network entity in accordance with the uplink beam measurement.

Aspect 14: The method of any of aspects 1 through 13, wherein the switching from the first beam comprising the first beam direction to the second beam comprising the second beam direction comprises: switching from the first beam comprising the first beam direction to the second beam comprising the second beam direction during a time window; and restoring the first beam comprising the first beam direction at an end of the time window.

Aspect 15: The method of any of aspects 1 through 13, wherein the switching from the first beam comprising the first beam direction to the second beam comprising the second beam direction comprises: switching from the first beam comprising the first beam direction to the second beam comprising the second beam direction upon expiration of a first timer; and restoring the first beam comprising the first beam direction upon expiration of a second timer.

Aspect 16: An apparatus for wireless communication at a UE comprising one or more memories and one or more processors coupled to the one or more memories, the one or more processors being configured to perform a method of any one of aspects 1 through 15.

Aspect 17: An apparatus for wireless communication at a UE comprising at least one means for performing a method of any one of aspects 1 through 15.

Aspect 18: A non-transitory computer-readable medium having stored therein instructions executable by one or more processors of a UE to perform a method of any one of aspects 1 through 15.

Aspect 19: A method operable at a network entity, the method comprising: identifying a first beam at a user equipment (UE) for communication with a non-terrestrial network (NTN) entity associated with the network entity, the first beam comprising a first beam direction; predicting a predicted beam direction change in accordance with one or more mobility parameters indicating a predicted change in a relative position of the UE with respect to the NTN entity; and providing an indication of a second beam different than the first beam for the UE to communicate with the NTN entity, the second beam comprising a second beam direction in accordance with the predicted beam direction change.

Aspect 20: The method of aspect 19, further comprising: enabling a configuration of one or more uplink reference signals for an uplink beam measurement to be provided to the UE; receiving beam measurement information associated with the one or more uplink reference signals sent in accordance with the configuration; and providing the indication of the second beam direction in accordance with the uplink beam measurement.

Aspect 21: The method of aspect 19, further comprising: identifying the second beam direction based on the one or more mobility parameters.

Aspect 22: The method of any of aspects 19 through 21, further comprising: accessing road infrastructure information; and identifying a current location of the UE and route information indicating a route of the UE.

Aspect 23: The method of aspect 22, wherein the road infrastructure information indicates one or more of a number of lanes, a road curvature, or a road slope.

Aspect 24: The method of aspect 22 or 23, wherein the one or more mobility parameters comprises at least one of the current location, the route information, or the road infrastructure information.

Aspect 25: The method of aspect 24, wherein the one or more mobility parameters further comprises at least one of the first beam direction, a location or elevation of the NTN entity, an antenna array size of the UE, or a half-power beam width of the UE.

Aspect 26: The method of aspect 22 or 23, wherein the one or more mobility factors comprises an ephemeris and speed of the NTN entity.

Aspect 27: The method of aspect 26, wherein the one or more mobility parameters further comprises at least one of the current location, the route information, or the road infrastructure information.

Aspect 28: The method of any of aspects 22 through 27, further comprising: receiving at least one of the road infrastructure information, the current location of the UE, or the route information.

Aspect 29: The method of any of aspects 19 through 28, wherein the indication of the second beam direction comprises a beam direction adjustment indication expressed in a UE local coordinate system or a global coordinate system.

Aspect 30: The method of any of aspects 19 through 29, further comprising: providing a time window during which the UE switches from the first beam direction to the second beam direction.

Aspect 31: The method of any of aspects 19 through 30, wherein the network entity is within the NTN entity or the network entity is a core network entity or an application layer network entity.

Aspect 32: An apparatus for wireless communication at a network entity comprising one or more memories and one or more processors coupled to the one or more memories, the one or more processors being configured to perform a method of any one of aspects 19 through 31.

Aspect 17: An apparatus for wireless communication at a network entity comprising at least one means for performing a method of any one of aspects 19 through 31.

Aspect 18: A non-transitory computer-readable medium having stored therein instructions executable by one or more processors of a network entity to perform a method of any one of aspects 19 through 31.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3$^{rd}$ Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word “exemplary” is used to mean “serving as an example, instance, or illustration.” Any implementation or aspect described herein as “exemplary” is not necessarily to be construed as preferred or advantageous over other aspects of the disclosure. Likewise, the term “aspects” does not require that all aspects of the disclosure include the discussed feature, advantage or mode of operation. The term “coupled” is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms “circuit” and “circuitry” are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-12 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 4-8, 10, and/or 12 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean “one and only one” unless specifically so stated, but rather “one or more.” Unless specifically stated otherwise, the term “some” refers to one or more. A phrase referring to “at least one of” a list of items refers to any combination of those items, including single members. As an example, “at least one of: a, b, or c” is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase “means for” or, in the case of a method claim, the element is recited using the phrase “step for.”

What is claimed is:

1. An apparatus for wireless communication at a user equipment (UE), the apparatus comprising:

one or more memories; and one or more processors coupled to the one or more memories, wherein the one or more processors are configured to cause the UE to:

communicate with a non-terrestrial network (NTN) entity based on a first beam at the UE, the first beam comprising a first beam direction;

receive a configuration of one or more uplink reference signals for an uplink beam measurement;

transmit the one or more uplink reference signals based on the configuration;

receive an indication of a second beam direction from a network entity associated with the NTN entity in accordance with the uplink beam measurement; and switch from the first beam comprising the first beam direction to a second beam comprising the second beam direction different than the first beam direction in accordance with a predicted beam direction change based on a predicted change in a relative position of the UE with respect to the NTN entity.

2. The apparatus of claim 1, wherein the one or more processors are further configured to cause the UE to:

predict the predicted beam direction change in accordance with one or more mobility parameters that indicate the predicted change in the relative position of the UE with respect to the NTN entity.

3. The apparatus of claim 2, further comprising:

one or more transceivers coupled to the one or more processors, wherein the one or more processors are further configured to cause the UE to:

transmit, via the one or more transceivers, a capability of the UE to determine the predicted beam direction change to the network entity associated with the NTN entity.

4. The apparatus of claim 2, wherein the one or more processors are further configured to cause the UE to:

identify the second beam direction based on the one or more mobility parameters.

5. The apparatus of claim 2, wherein the one or more processors are further configured to cause the UE to:

access a digital map that indicates road infrastructure information; and identify a current location of the UE and route information that indicates a route of the UE.

6. The apparatus of claim 5, wherein the road infrastructure information indicates one or more of a number of lanes, a road curvature, or a road slope related to the route of the UE.

7. The apparatus of claim 5, wherein the one or more mobility parameters comprise at least one of the current location, the route information, or the road infrastructure information.

8. The apparatus of claim 7, wherein the one or more mobility parameters further comprise at least one of the first beam direction, a location or elevation of the NTN entity, an antenna array size of the UE, or a half-power beam width of the UE.

9. The apparatus of claim 5, wherein the one or more mobility parameters comprise an ephemeris and speed of the NTN entity.

10. The apparatus of claim 9, wherein the one or more mobility parameters further comprise at least one of the current location, the route information, or the road infrastructure information.

11. The apparatus of claim 1, wherein the one or more processors are further configured to cause the UE to:

switch from the first beam comprising the first beam direction to the second beam comprising the second beam direction within a time window; and restore the first beam comprising the first beam direction at an end of the time window.

12. The apparatus of claim 1, wherein the one or more processors are further configured to cause the UE to:

switch from the first beam comprising the first beam direction to the second beam comprising the second beam direction upon expiration of a first timer; and restore the first beam comprising the first beam direction upon expiration of a second timer.

13. An apparatus for wireless communication at a network entity, the apparatus comprising:

one or more memories; and one or more processors coupled to the one or more memories, wherein the one or more processors are configured to cause the network entity to:

identify a first beam at a user equipment (UE) for communication with a non-terrestrial network (NTN) entity associated with the network entity, wherein the first beam comprises a first beam direction;

predict a predicted beam direction change in accordance with one or more mobility parameters that indicate a predicted change in a relative position of the UE with respect to the NTN entity;

enable a configuration of one or more uplink reference signals for an uplink beam measurement to be provided to the UE;

receive beam measurement information associated with the one or more uplink reference signals sent in accordance with the configuration; and provide an indication of a second beam different than the first beam for the UE to communicate with the NTN entity in accordance with the uplink beam measurement, wherein the second beam comprises a second beam direction in accordance with the predicted beam direction change.

14. The apparatus of claim 13, wherein the one or more processors are further configured to cause the network entity to:

identify the second beam direction based on the one or more mobility parameters.

15. The apparatus of claim 13, wherein the one or more processors are further configured to cause the network entity to:

access road infrastructure information; and identify a current location of the UE and route information that indicates a route of the UE.

16. The apparatus of claim 15, wherein the road infrastructure information indicates one or more of a number of lanes, a road curvature, or a road slope.

17. The apparatus of claim 15, wherein the one or more mobility parameters comprise at least one of the current location, the route information, or the road infrastructure information.

18. The apparatus of claim 17, wherein the one or more mobility parameters further comprise at least one of the first beam direction, a location or elevation of the NTN entity, an antenna array size of the UE, or a half-power beam width of the UE.

19. The apparatus of claim 15, wherein the one or more mobility parameters comprise an ephemeris and speed of the NTN entity.

20. The apparatus of claim 19, wherein the one or more mobility parameters further comprise at least one of the current location, the route information, or the road infrastructure information.

21. The apparatus of claim 15, wherein the one or more processors are further configured to cause the network entity to:

receive at least one of the road infrastructure information, the current location of the UE, or the route information.

22. The apparatus of claim 13, wherein the indication of the second beam direction comprises a beam direction adjustment indication expressed in a UE local coordinate system or a global coordinate system.

23. The apparatus of claim 13, wherein the one or more processors are further configured to cause the network entity to:

provide a time window for the UE switch from the first beam direction to the second beam direction.

24. The apparatus of claim 13, wherein the network entity is within the NTN entity or the network entity is a core network entity or an application layer network entity.

25. A method operable at a user equipment (UE), the method comprising:

communicating with a non-terrestrial network (NTN) entity using a first beam at the UE, the first beam comprising a first beam direction;

receiving a configuration of one or more uplink reference signals for an uplink beam measurement;

transmitting the one or more uplink reference signals based on the configuration;

receiving an indication of a second beam direction from a network entity associated with the NTN entity in accordance with the uplink beam measurement; and switching from the first beam comprising the first beam direction to a second beam comprising the second beam direction different than the first beam direction in accordance with a predicted beam direction change based on a predicted change in a relative position of the UE with respect to the NTN entity.

26. The method of claim 25, further comprising:

predicting the predicted beam direction change in accordance with one or more mobility parameters that indicate the predicted change in the relative position of the UE with respect to the NTN entity.

27. The method of claim 26, further comprising:

identifying the second beam direction based on the one or more mobility parameters.

28. A method operable at a network entity, the method comprising:

identifying a first beam at a user equipment (UE) for communication with a non-terrestrial network (NTN) entity associated with the network entity, the first beam comprising a first beam direction;

predicting a predicted beam direction change in accordance with one or more mobility parameters indicating a predicted change in a relative position of the UE with respect to the NTN entity;

enabling a configuration of one or more uplink reference signals for an uplink beam measurement to be provided to the UE;

receiving beam measurement information associated with the one or more uplink reference signals sent in accordance with the configuration; and providing an indication of a second beam different than the first beam for the UE to communicate with the NTN entity in accordance with the uplink beam measurement, wherein the second beam comprises a second beam direction in accordance with the predicted beam direction change.

29. The method of claim 28, further comprising:

identifying the second beam direction based on the one or more mobility parameters.

30. The method of claim 29, further comprising:

accessing road infrastructure information; and identifying a current location of the UE and route information that indicates a route of the UE, wherein the one or more mobility parameters comprise at least one of the current location, the route information, or the road infrastructure information.

* * * * *